(12) United States Patent
Wheatley et al.

(10) Patent No.: US 11,187,576 B2
(45) Date of Patent: Nov. 30, 2021

(54) OPTICAL FILTERS HAVING SPATIALLY VARIANT MICROREPLICATED LAYERS

(71) Applicant: 3M INNOVATIVE PROPERTIES COMPANY, St. Paul, MN (US)

(72) Inventors: John A. Wheatley, Stillwater, MN (US); Gilles J. Benoit, Minneapolis, MN (US); Guanglei Du, New York, NY (US); Rolf W. Biernath, Wyoming, MN (US); Sara Suzanne Merritt, Grant, MN (US); James Hillis, Redmond, WA (US); Owen M. Anderson, Minneapolis, MN (US); Timothy J. Nevitt, Red Wing, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 374 days.

(21) Appl. No.: 16/306,659

(22) PCT Filed: May 25, 2017

(86) PCT No.: PCT/US2017/034543
§ 371 (c)(1),
(2) Date: Dec. 3, 2018

(87) PCT Pub. No.: WO2017/210089
PCT Pub. Date: Dec. 7, 2017

(65) Prior Publication Data
US 2019/0293486 A1   Sep. 26, 2019

Related U.S. Application Data

(60) Provisional application No. 62/345,498, filed on Jun. 3, 2016.

(51) Int. Cl.
*G01J 1/04* (2006.01)
*G02B 5/20* (2006.01)
(Continued)

(52) U.S. Cl.
CPC ............... *G01J 1/0492* (2013.01); *G01J 1/20* (2013.01); *G01J 3/12* (2013.01); *G01J 3/28* (2013.01);
(Continued)

(58) Field of Classification Search
None
See application file for complete search history.

(56) References Cited

U.S. PATENT DOCUMENTS 6,208,466 B1   3/2001   Liu
6,262,786 B1   7/2001   Perlo
(Continued)

FOREIGN PATENT DOCUMENTS

CN   102105985   6/2011
CN   101414614   7/2011
(Continued)

OTHER PUBLICATIONS

International Search Report for PCT International Application No. PCT/US2017/034543, dated Jul. 25, 2017, 7 pages.

*Primary Examiner* — Derek S. Chapel
(74) *Attorney, Agent, or Firm* — Clifton F. Richardson

(57) ABSTRACT

In an example, an example article may include a spatially variant microreplicated layer optically coupled to a wavelength selective filter. The wavelength selective filter may have a light incidence angle-dependent optical band. The spatially variant microreplicated layer may be configured to transmit light to a first optical region of the wavelength selective filter at a first predetermined incidence angle and to
(Continued)

a second optical region of the wavelength selective filter at a second predetermined incidence angle.

22 Claims, 15 Drawing Sheets

(51) Int. Cl.
    *G01J 1/20*     (2006.01)
    *G01J 3/12*     (2006.01)
    *G01J 3/28*     (2006.01)
    *G01J 3/46*     (2006.01)
    *G01N 21/31*     (2006.01)
    *G01J 3/51*     (2006.01)
    *G02B 5/136*     (2006.01)

(52) U.S. Cl.
    CPC ................ *G01J 3/46* (2013.01); *G01J 3/513* (2013.01); *G01N 21/31* (2013.01); *G02B 5/136* (2013.01); *G01J 2003/1213* (2013.01); *G01J 2003/2806* (2013.01); *G02B 5/201* (2013.01)

(56) References Cited

U.S. PATENT DOCUMENTS

| | | | |
|---|---|---|---|
| 7,420,663 B2 | 9/2008 | Wang | |
| 7,954,990 B2 | 6/2011 | Gourlay | |
| 8,264,622 B2 | 9/2012 | Gourlay | |
| 8,419,986 B2 | 4/2013 | Gourlay | |
| 8,467,013 B2 | 6/2013 | Gourlay | |
| 8,879,812 B2 | 11/2014 | Levenson | |
| 8,976,357 B2 | 3/2015 | Uematsu | |
| 9,010,983 B2 | 4/2015 | Gourlay | |
| 9,046,637 B1* | 6/2015 | Bennett ................ G02B 6/0096 |
| 2007/0031140 A1 | 2/2007 | Biernath | |
| 2008/0144333 A1 | 6/2008 | Gourlay | |
| 2008/0272454 A1 | 11/2008 | Toshikiyo | |
| 2009/0080075 A1 | 3/2009 | Ho | |
| 2009/0128672 A1 | 5/2009 | Watanabe | |
| 2009/0303467 A1 | 12/2009 | Ashdown | |
| 2010/0296025 A1 | 11/2010 | Gourlay | |
| 2011/0205535 A1 | 8/2011 | Soller | |
| 2011/0216315 A1 | 9/2011 | Uematsu et al. | |
| 2011/0310276 A1 | 12/2011 | Lim et al. | |
| 2012/0236313 A1 | 9/2012 | Nakamura | |
| 2013/0094084 A1 | 4/2013 | Merrill | |
| 2013/0324819 A1 | 12/2013 | Colvin, Jr. | |
| 2014/0051955 A1 | 2/2014 | Tiao | |
| 2014/0347748 A1 | 11/2014 | Duparre | |
| 2015/0077600 A1 | 3/2015 | Kobayashi et al. | |
| 2015/0077617 A1* | 3/2015 | Komiya .................. G01J 3/513 |
| | | | 348/336 |
| 2015/0116982 A1 | 4/2015 | Jao | |
| 2015/0318320 A1 | 11/2015 | Lin et al. | |
| 2016/0054173 A1 | 2/2016 | Kim | |
| 2016/0065814 A1 | 3/2016 | Kim et al. | |

FOREIGN PATENT DOCUMENTS

| | | |
|---|---|---|
| CN | 102262253 | 11/2011 |
| CN | 101592751 | 10/2012 |
| CN | 101983357 | 5/2013 |
| CN | 101952749 | 7/2013 |
| CN | 204044759 | 12/2014 |
| CN | 104965253 | 4/2017 |
| CN | 104272088 | 5/2017 |
| CN | 105023929 | 1/2018 |
| GB | 2468353 | 9/2010 |
| GB | 2468875 | 9/2010 |
| GB | 2475510 | 5/2011 |
| GB | 2475738 | 6/2011 |
| JP | 2004-251673 | 9/2004 |
| JP | 2013-041208 | 2/2013 |
| WO | WO 2008-009093 | 1/2008 |
| WO | WO 2015-081299 | 6/2015 |

* cited by examiner

OPTICAL FILTERS HAVING SPATIALLY VARIANT MICROREPLICATED LAYERS

FIELD

The disclosure relates to optical filters and sensors including optical filters. The disclosure is also related to optical filters having spatially variant microreplicated layers.

BACKGROUND

Optical filters are employed in a wide variety of applications such as optical communication systems, optical sensors, imaging, scientific and industrial optical equipment, and display systems. Optical filters may include optical layers that manage the transmission of incident electromagnetic radiation, including light. Optical filters may reflect or absorb a portion of incident light, and transmit another portion of incident light. Optical layers within an optical filter may differ in wavelength selectivity, optical transmittance, optical clarity, optical haze, and index of refraction.

UV, visible, and near infrared sensing and communication architectures may include a sensor (or sensor array) that can detect spectral information which can be used to determine many parameters of interest. In addition, sensors may be used for Visible Light Communication (VLC or Lidar) such as LiFi, gesture sensing, and many other applications. Improvements in the spectral selectivity and sensitivity of filters and sensors continue to be sought.

SUMMARY

The disclosure describes an example article including a spatially variant microreplicated layer optically coupled to a wavelength selective filter. The wavelength selective filter may have a light incidence angle-dependent optical band. The spatially variant microreplicated layer may be configured to transmit light to a first optical region of the wavelength selective filter at a first predetermined incidence angle and to a second optical region of the wavelength selective filter at a second predetermined incidence angle.

The disclosure describes an example article including a wavelength selective filter having a first band edge at a first light incidence angle. The example article may include a microreplicated layer optically coupled to the wavelength selective filter. The microreplicated layer may include a plurality of microreplicated features. At least one microreplicated feature of the plurality of microreplicated features may be configured to transmit light to a first region of the wavelength selective filter at the first light incidence angle.

The disclosure describes an example technique including illuminating a sample with a light source to obtain a characteristic light. The light source may emit a broad band, a narrow band, or a multiband spectrum. The light source may emit non-polarized or polarized (linear, circular, or elliptical) light. The example technique may include passing the characteristic light through a spatially variant microreplicated layer optically coupled to a wavelength selective filter to transmit filtered characteristic light to each region of a plurality of regions of the wavelength selective filter at a respective incidence angle of a plurality of incidence angles. Each respective incidence angle may be associated with a known narrow band of a plurality of narrow bands. The example technique may include sensing a respective intensity of the filtered characteristic light transmitted by each respective region of the wavelength selective filter at a respective sensor element of a plurality of sensor elements. The example technique may include comparing the filtered characteristic spectrum sensed by the plurality of sensor elements with a known reference spectrum associated with a species by curve fitting each sensed respective intensity against the known reference spectrum. The curve fitting may include matching each sensed respective intensity with a respective expected intensity associated with the respective narrow band associated with the respective region that transmitted the respective intensity of the filtered characteristic light. The example technique may include determining the presence of the species in the sample based on the comparison.

The disclosure describes an example technique including illuminating a sample with a broad-band light source to obtain a characteristic light. The example technique may include passing the characteristic light through an optical filter to transmit filtered characteristic light to a broad-band sensor at each respective predetermined angle of a plurality of predetermined angles. The example technique may include determining a cumulative spectral power distribution in angle space of the filtered characteristic light by sensing a respective intensity of the filtered characteristic light transmitted at each respective predetermined angle. The example technique may include converting the cumulative spectral power distribution in angle space to a cumulative spectral power distribution in wavelength space based on the angular dispersion of a band edge of the optical filter. The example technique may include determining a spectral power distribution of the filtered characteristic light by determining a mathematical derivative of the cumulative spectral power distribution in wavelength space. The example technique may include comparing the spectral power distribution to a known reference spectral power distribution of a species. The example technique may include determining the presence of the species in the sample based on the comparison.

The disclosure describes an example article including a spatially variant refractive structure layer optically coupled to a wavelength selective filter. The wavelength selective filter may have a light incidence angle-dependent optical band. The spatially variant refractive structure layer may be configured to transmit light to a first optical region of the wavelength selective filter at a first predetermined incidence angle and to a second optical region of the wavelength selective filter at a second predetermined incidence angle.

The details of one or more aspects of the invention are set forth in the accompanying drawings and the description below. Other features, objects, and advantages of the invention will be apparent from the description and drawings, and from the claims.

BRIEF DESCRIPTION OF DRAWINGS

The foregoing and other aspects of this invention are made more evident in the following Detailed Description, when read in conjunction with the attached Figures.

It should be understood that features of certain Figures of this disclosure may not necessarily be drawn to scale, and that the Figures present non-exclusive examples of the techniques disclosed herein.

DETAILED DESCRIPTION

Optical filters may be used to change the spectrum of reflected or transmitted light. For example, multilayer optical films (MOFs) may be used in optical filters. MOFs can be made using multilayer thin film techniques, and, the wavelength range and other optical properties of MOFs may be a function of the range of thicknesses and refractive indices of the layers. However, since the optical properties of optical filters such as MOFs depend on the structure and composition of various internal layers, changing or tuning the optical properties of optical filters may require relatively expensive changes to the manufacturing process. For example, the manufacturing process may have to be stopped, recalibrated, and restarted for each sample or batch of optical filters having different optical properties that are to be produced.

The disclosure provides example techniques and optical filters that allow for post-manufacture or downstream tuning of optical properties of MOFs and other optical filters, for example, by applying a microreplicated layer on a major surface of a base optical filter. Thus, the range of angles incident on the film may be tuned to different optical properties, whereby substantially the same base or underlying optical filter may generate different optical responses, avoiding the need for changing the properties of the base optical filter itself. For example, a batch of a base optical filter produced in a single run may be customized into different product lines, each with different predetermined optical properties, by disposing a suitable microreplicated layer on the base optical filter.

Figure 1A:
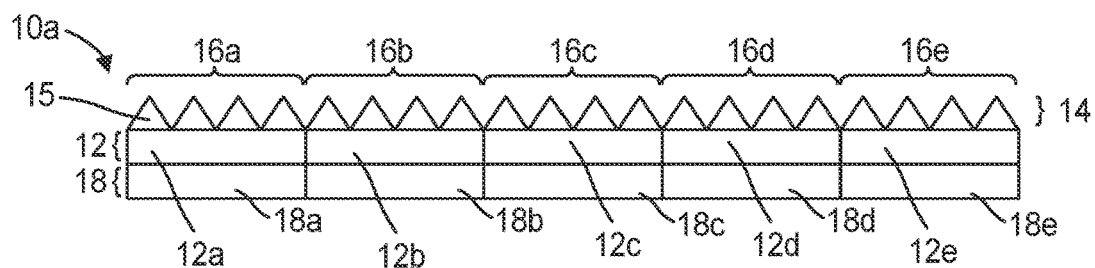
FIG. 1A is a conceptual and schematic lateral cross-sectional view of an example article including an example optical filter.

FIG. 1A is a conceptual and schematic lateral cross-sectional view of an example article 10a including an example optical filter. In some examples, the example optical filter may include a wavelength selective filter 12 optically coupled to a spatially variant microreplicated layer 14. In some examples, spatially variant microreplicated layer 14 may transmit light to wavelength selective filter 12. The example optical filter or wavelength selective filter 12 may be optically coupled to a light sensor 18. In some examples, light sensor 18 may sense light transmitted by wavelength selective filter 12. For example, light sensor 18 may sense light transmitted by wavelength selective filter 12 that is received from spatially variant microreplicated layer 14 by wavelength selective filter 12. In some examples, one or more layers of an optically clear adhesive may be used to optically couple one or more of wavelength selective filter 12, spatially variant microreplicated layer 14, and light sensor 18. Optical elements that are optically coupled may transmit and receive light without any substantial change in predetermined optical characteristics, for example, intensity, for predetermined wavelengths. Optical elements may be optically coupled by disposing them sufficiently near each other to allow transmission of light between the optical elements, or by disposing air, glass, polymer, a refractive medium, an optically clear adhesive, a guide, or any suitable optical medium between respective light transmitting and receiving surfaces of the optical elements. In some examples, one or more surfaces of one or more of wavelength selective filter 12, spatially variant microreplicated layer 14, and light sensor 18 may be disposed relative to each other so that light transmitted or reflected by one surface may be received by a second surface. In some examples, one or more of wavelength selective filter 12, spatially variant microreplicated layer 14, and light sensor 18 may be optically coupled by light guides, films, mirrors, optically clear adhesives, or other optical paths. In some examples, light sensed by light sensor 18 may be light transmitted or reflected by a sample or an object illuminated by a light source. The light may include one or more of visible, ultraviolet, infrared, or near-infrared wavelengths, or any other wavelengths. The light may be transmitted or reflected by one or both of wavelength selective filter 12 or spatially variant microreplicated layer 14 before arriving at light sensor 18.

Wavelength selective filter 12 may have a light incidence angle-dependent optical band. Wavelength selective filter 12 may have one or more of selective transmission, reflection, or scattering bands. For example, wavelength selective filter 12 may have a narrow transmission band. In some examples, wavelength selective filter 12 may include interference filters having a predetermined angle shift. For example, wavelength selective filter 12 may include an edge filter, a notch filter, or a comb filter. In some examples, wavelength selective filter 12 may include an interference filter, for example, a MOF interference filter, or a giant birefringent optics interference filter. Interference filters may include interference films that may include inorganic layers, organic layers, isotropic layers, and hybrids, for example, metal/dielectric stacks. Interference filters may be manufactured using deposition (for example, vapor, sputtering, and atomic layer deposition), coextrusion, or any other suitable technique. In some examples, wavelength selective filter 12 may include a MOF, for example, a multilayer dielectric stack of a plurality of optical layers having a predetermined transmission or reflection band. For example, each optical layer of the plurality of optical layers may include a dielectric material having a predetermined refractive index, and the difference between refractive indices of respective optical layers of the MOF may result in the predetermined optical band. In some examples, the MOF may include one or more of polymeric layers, birefringent layers, reflectors, partial reflectors, absorbing dyes, absorbing pigments, organic, inorganic, isotropic, or anisotropic materials. For example, the layers may be extruded or coextruded. Wavelength selective filter 12 may include multiple layers each having a predetermined refractive index. In some examples, wavelength selective filter 12 may include relatively high index (for example, having refractive indices greater than about 1.3, or about 1.5) layers. In some examples, wavelength selective filter 12 may include relatively low index (for example, having refractive indices lower than about 1.3, or about 1.5) layers. Higher index layers may tend to shift angles of light less compared to lower index layers. In some examples, a larger angle shift may increase the breadth of optical wavelength bands associated with wavelength selective filter 12. In some examples, wavelength selective filter 12 may have one or more optical bands. For example, the optical band may include one or more of a reflective band, a transmissive band, a narrow band, a broad band, a visible band, a near-infrared band, a pass band, or a stop band. One or more optical bands (for example, transmission or reflection) of wavelength selective filter 12 may change with the light incidence angle of incident light. For example, one or more band edges of optical bands associated with wavelength selective filter may shift as the angle of incidence of light shifts. For example, the center of a band-pass window may shift from about a first wavelength when the angle of incidence is zero relative to a normal axis on a surface of wavelength selective filter 12 to a second wavelength at an incident angle of greater than zero. Thus, by changing the light incidence angle, different optical bands may be obtained. In some examples, wavelength selective filter 12 have a relatively narrow optical band, for example, an optical band having band edges separated by a bandwidth of less than 100 nm, or less than 50 nm. In some examples, wavelength selective filter 12 have a relatively broad optical band, for example, an optical band having band edges separated by a bandwidth of greater than 100 nm, greater than 200 nm, greater than 300 nm, or greater than 500 nm. In some examples, wavelength selective filter 12 may have one or more optical bands with respective band edges.

In some examples, wavelength selective filter 12 may have one or more optical regions, for example, a first optical region 12a, a second optical region 12b, a third optical region 12c, a fourth optical region 12d, and a fifth optical region 12e as shown in FIG. 1A. In some examples, one or more optical regions may be reflecting, or transmitting. For example, at least one optical region of wavelength selective filter 12 may be a reflective region. In some examples, at least one optical region of wavelength selective filter 12 may be a transmissive region. In some examples, spatially variant microreplicated layer 14 may include greater than 2, greater than 5, greater than 10, greater than 100, or greater than 1,000 regions. Each optical region of wavelength selective filter 12 may receive light from a corresponding predetermined region of spatially variant microreplicated layer 14. In some examples, spatially variant microreplicated layer 14 may be configured to transmit light to the first optical region 12a of the wavelength selective filter at a first predetermined incidence angle, and to a second optical region 12b of the wavelength selective filter at a second predetermined incidence angle. In some examples, spatially variant microreplicated layer 14 may be configured to transmit light to each optical region of the plurality of optical regions of wavelength selective filter 12 at a respective predetermined incidence angle of a plurality of predetermined incidence angles. For example, the plurality of optical regions may include the first and second optical regions 12a and 12b, and wherein the plurality of predetermined incidence angles comprises the first and second predetermined incidence angles. In some examples, each predetermined incidence angle of the plurality of predetermined incidence angles may be configured to shift the angle-dependent optical band of the wavelength selective filter to a respective predetermined shifted band of a plurality of predetermined shifted bands.

To transmit light at different angles to wavelength selective filter 12, in some examples, spatially variant microreplicated layer 14 may include a plurality of microreplicated features 15. For example, the plurality of microreplicated features 15 may include one or more of a prism, an angle-limiting element, or a collimating element. In some examples, spatially variant microreplicated layer 14 may include a substrate (not shown). For example, one or more microreplicated features 15 may be disposed on a surface of the substrate, or within a volume of the substrate. In some examples, the substrate may be substantially optically transparent. In some examples, wavelength selective filter 12 may act as the substrate for microreplicated features 15. Microreplicated features 15 or the substrate may include glass, polymer, ceramic, dielectric, or any other suitable optical material. Microreplicated features 15 may be cofabricated with the substrate, or may be attached to the substrate with an optically clear adhesive, or may otherwise be retained on the substrate. In some examples, microreplicated features 15 may be disposed in a predetermined pattern on the substrate. In some examples, spatially variant microreplicated layer 14 may include more than one layer of refractive structures or microreplicated features.

Microreplicated features 15 may have predetermined geometries to shift angles of light beams transmitted or reflected by microreplicated features 15. For example, as shown in FIG. 1A, microreplicated features 15 may include a prism, a lens, a lenticular element, a curved element, a rounded element, or any other suitable element capable of shifting angle of incidence of light. Microreplicated features 15 may be symmetric or asymmetric about a predetermined axis. Each of the microreplicated features 15 may have internal optical features that may change the angle of a light beam incident on a surface of the microreplicated feature to a different angle transmitted through. For example, each of the microreplicated features 15 may define an internal light path angle, such as a prism angle, that shifts the angle of a light beam by a predetermined extent. In some examples, one or more of microreplicated features 15 may respectively exhibit a predetermined prism face angle (tilt of a prism facet relative to the substrate) between about 0° and about 90°, for example, about 0°, 10°, 20°, 30°, 40°, 50°, 60°, 70°, 80°, 90°, or any other suitable predetermined angle. In some examples, one or more of microreplicated features 15 may respectively exhibit a predetermined prism apex angle (angle defined by an apex of the prism in a plane normal on a surface) between about 0° and about 180°. Depending on the prism face angle or the prism apex angle, the prism may deflect incident light by different angles. In some examples, one or more of microreplicated features 15 may have the same or different refractive indices and the same or different light shift angles. In some examples, spatially variant microreplicated layer 14 includes at least two microreplicated features 15 having different light shift angles, for example, different prism angles. Thus, microreplicated features 15 having different light shift angles may transmit light to different regions of wavelength selective filter 12 at different angles. In some examples, each microreplicated feature of the plurality of microreplicated features 15 may transmit light to a respective optical region at a respective predetermined incidence angle.

In some examples, plurality of microreplicated features 15 may include a plurality of subpluralities of microreplicated features. For example, as shown in FIG. 1A, spatially variant microreplicated layer 14 may include subpluralities 16a, 16b, 16c, 16d, and 16e. In some examples, spatially variant microreplicated layer 14 may include greater than 2, greater than 5, greater than 10, greater than 100, greater than 1,000, or greater than 10,000 subpluralities. Each subplurality of microreplicated features 16 may transmit light to a respective optical region at a respective predetermined incidence angle. For example, each respective microreplicated feature of the plurality of microreplicated features 15 may define a light shift angle that determines the light incidence angle of light transmitted by the respective microreplicated feature to the respective optical region of wavelength selective filter 12.

While spatially variant microreplicated layer 14 and microreplicated features 15 are described above, in some examples, spatially variant microreplicated layer 14 may be replaced by a surface relief layer. For example, the surface relief layer may include a plurality of optical elements or beads having predetermined diameters or sag depths. In some examples, the surface relief layer may not be spatially variant, and instead be substantially spatially uniform. In some examples, layer 14 may include a spatially variant refractive structure including refractive structures 15 instead of microreplicated features 15.

In some examples, respective optical regions of wavelength selective filter 12 may receive light transmitted by respective subpluralities or regions of spatially variant microreplicated layer 14. For example, as shown in FIG. 1A, subplurality 16a of spatially variant microreplicated layer 14 may transmit light at a first predetermined angle to first optical region 12a, and subplurality 16b of spatially variant microreplicated layer 14 may transmit light at a second predetermined angle to second optical region 12b. In some examples, each subplurality 16a-16e of spatially variant microreplicated layer 14 may transmit light at a respective predetermined angle to respective optical region of optical regions 12a-12e. As discussed above, spatially variant microreplicated layer 14 may include any number of suitable subpluralities, and wavelength selective filter 12 may include any number of suitable optical regions. In some examples, the number of optical regions may be the same, greater, or less than the number of subpluralities of microreplicated features 15. For example, more than one microreplicated feature may transmit light to the same optical region of wavelength selective filter 12, and multiple optical regions of wavelength selective filter 12 may receive light transmitted from the same microreplicated feature or the same subplurality of microreplicated features 15.

Figure 1B:
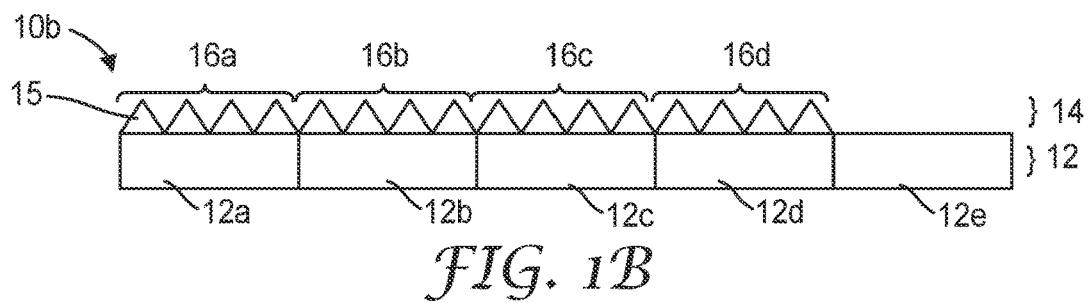
FIG. 1B is a conceptual and schematic lateral cross-sectional view of an example article including an example optical filter.

In some examples, wavelength selective layer 12 may include an unshifted region. For example, FIG. 1B is a conceptual and schematic lateral cross-sectional view of an example article 10b including an example optical filter. Unshifted region 12e of wavelength selective layer 12 may not be optically coupled to any microreplicated feature or to any region of spatially variant microreplicated layer 14. For example, unshifted region 12e of the wavelength selective filter may be configured to receive light that is not transmitted through spatially variant microreplicated layer 14.

Figure 1C:
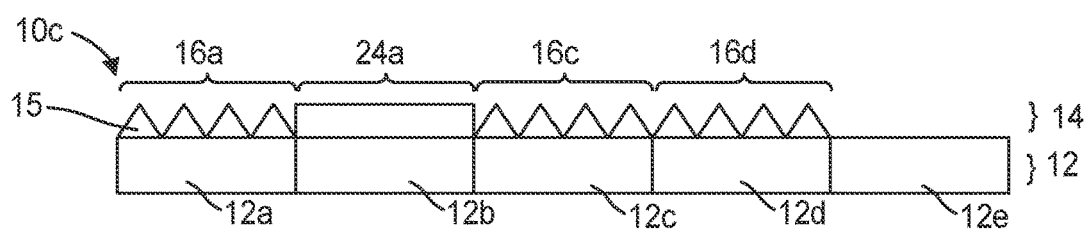
FIG. 1C is a conceptual and schematic lateral cross-sectional view of an example article including an example optical filter.
Figure 1D:
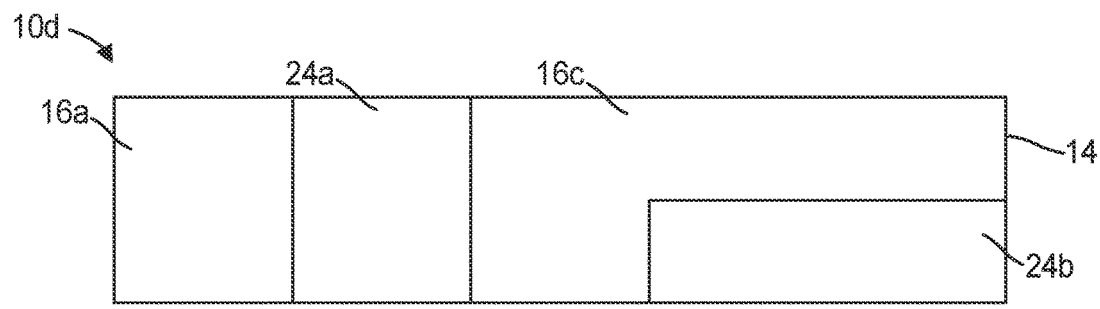
FIG. 1D is a conceptual and schematic top view of an example article including an example optical filter.
Figure 1E:
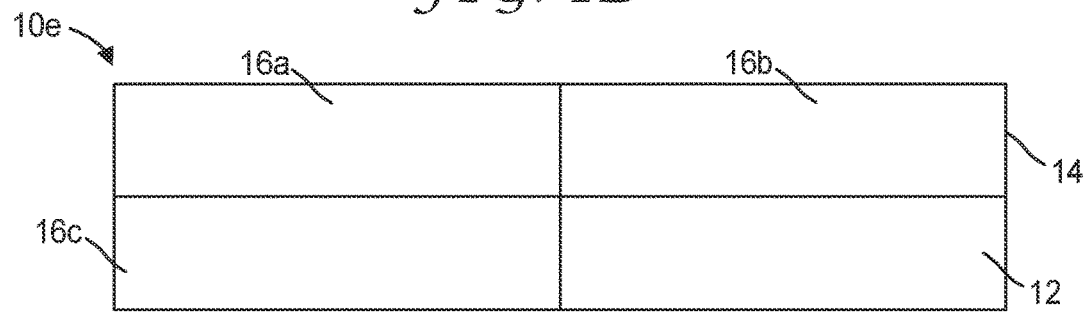
FIG. 1E is a conceptual and schematic top view of an example article including an example optical filter.

In some examples, spatially variant microreplicated layer 14 may include one or more planarized regions. For example, FIG. 1C is a conceptual and schematic lateral cross-sectional view of an example article 10c including an example optical filter. In the example shown in FIG. 1C, spatially variant microreplicated layer 14 may include a planarized region 24a. Planarized region 24a may be configured to transmit light to wavelength selective film 12 without substantially changing the angle of incidence. In some examples, planarized region 24a may include a substantially planar deposit of optical material on a target region of spatially variant microreplicated layer 14 to planarize the target region. For example, before planarization, the target region may exhibit at least some microreplicated features 15, or may exhibit no microreplicated features. After planarization, the target region may include at least some microreplicated features 15 embedded in the planarizing material such that they are ineffective to substantially change the light of incidence, for example, because the refractive index of the planarizing material may match a refractive index of at least some microreplicated features 15. In some examples, the refractive index of the planarizing material may not match the refractive index of microreplicated features 15. One or more planarized regions may extend across a two-dimensional surface region of spatially variant microreplicated layer 14. For example, FIG. 1D is a conceptual and schematic top view of an example article 10d including an example optical filter. As shown in FIG. 1D, in some examples, planarized region 24a, and a second planarized region 24b, may respectively extend across predetermined surface regions. In some examples, subpluralities of microreplicated features 15 may extend across respective predetermined surface regions of spatially variant microreplicated layer 14. For example, FIG. 1E is a conceptual and schematic top view of an example article 10e including an example optical filter. As shown in FIG. 1E, in some examples, subpluralities 16a, 16b, and 16c may respectively extend across predetermined regions optically coupled to wavelength selective filter 12, while a region of wavelength selective filter 12 is not optically coupled to any region of spatially variant microreplicated layer 14.

In some examples, articles 10a-10e may further include spectrally selective absorbers, for example, dyes or pigments. The spectrally selective absorbers may be applied in a uniform layer, or as a predetermined pattern to a predetermined selected surface or within the bulk of one or both of wavelength selective filter 12, spatially variant microreplicated layer 14, microreplicated features 15, an adhesive, in a substrate, or any other layer.

Spatially variant microreplicated layer 14 in example articles may increase the internal light propagation angle θ to be greater than the internal propagation angle from a flat surface ($\theta_{flat}$), and less than the internal critical angle ($\theta_{critical}$) according to EQUATION NO. 1.

$$\theta_{flat} < \theta < \theta_{critical} \qquad \text{EQUATION NO. 1}$$

Further, microreplicated features 15 in spatially variant microreplicated layer 14 may shift a wavelength by changing the angle of incidence of light on an underlying optical filter, which may have an angular shift characterized by EQUATION NO. 2, where θ is the angle of incidence, $\lambda_\theta$ is the resulting wavelength at angle θ, $\lambda_0$ is the central wavelength at normal incidence, no is the index of incident medium, and $n_f$=effective index of the filter.

$$<\lambda_\theta<\lambda_0(1-n_0/n_f(\sin^2\theta))^{1/2} \qquad \text{EQUATION NO. 2}$$

Thus, optical filter pass wavelengths can be shifted by optically coupling spatially variant microreplicated layer 14 with the wavelength selective filter 12, since spatially variant microreplicated layer 14 may change the angle of incidence. In some examples, spatially variant microreplicated layer 14 may introduce light at a supercritical angle in wavelength selective filter 12. Further, in some examples, spatially variant microreplicated layer 14 may change the angle of incidence to different degrees at different regions or locations, so wavelength selective filter 12 in combination with spatially variant microreplicated layer 14 may present different optical filter pass wavelengths at different regions. For example, spatially variant microreplicated layer 14 may be disposed adjacent wavelength selective filter 12 to limit the filter band shift as a function of angle, change the bandpass angular starting position or range, provide different spectral response at different locations, and create a two-dimensional variation of band edge characteristics over the area of wavelength selective filter 12.

Therefore, apart from post-manufacture tuning of wavelength selective filter 12, example articles according to the disclosure may provide spatially variant optical filters that exhibit different optical properties at different regions. Further, example spectrophotometers according to the disclosure may include a spatially variant optical filter disposed adjacent light sensor 18, such that the filter transmits light of different wavelengths or wavelength bands at different regions onto different pixels, sensor elements, or sensor regions of the sensor. Example articles and techniques according to the disclosure may be used for hyperspectral imaging, or capturing both the spectrum and the image of a source. Thus, the activation or signal strength of respective pixels of the sensor may correspond to the intensity of particular wavelengths or wavelength bands within the light incident on the spectrophotometer. For example, the intrinsic angular dispersion of optical interference filters may be used for spectral analysis by combining the optical filters with appropriate sensors. This may be used to affect signal to noise ratio, angular sensitivity, and enable multifunctional sensors. This effect may be useful in decorative and energy-saving laminated window films and for sensor applications such as blood analysis and related biometrics. The modified optical filters may be used to control the angular emission of single-wavelength LEDs in a film format without requiring a lens.

Thus in some examples, wavelength selective filter 12 may have a first band edge at a first light incidence angle, and at least one microreplicated feature of the plurality of microreplicated features 15 may be configured to transmit light to a first region of the wavelength selective filter 12 at the first light incidence angle. In some examples, at least a first subplurality of the subpluralities of microreplicated features 15 may include the at least one microreplicated feature, and each microreplicated feature of the first subplurality of microreplicated features 15 may be configured to transmit light to the first region of the wavelength selective filter 12 at the first light incidence angle. In some examples, the wavelength selective filter may have a second band edge at a second light incidence angle, and each microreplicated feature of a second subplurality of microreplicated features may be configured to transmit light to a second region of the wavelength selective film 12 at the second light incidence angle.

Light that is transmitted by or reflected from wavelength selective filter 12, for example by or from one or more optical regions of wavelength selective filter 12, may be sensed by light sensor 18. For example, as shown in FIG. 1A, light sensor 18 may include a plurality of sensing elements 18a, 18b, 18c, 18d, and 18e. One or more sensing elements may be configured to sense predetermined wavelengths, for example, predetermined narrow or broad wavelength bands in the visible, ultraviolet, infrared, or near-infrared spectrum, or combinations thereof. In some examples, each sensing element of the plurality of sensing elements of light sensor 18 may be configured to sense light received (for example, transmitted or reflected) from at least one optical region of the plurality of optical regions of wavelength selective film 12. For example, as shown in FIG. 1A, a first sensing element 18a may sense light transmitted by first optical region 12a, a second sensing element 18a may sense light transmitted by second optical region 12b, a third sensing element 18c may sense light transmitted by third optical region 12c, a fourth sensing element 18d may sense light transmitted by fourth optical region 12d, and a fifth sensing element 18e may sense light transmitted by third optical region 12e. In some examples, light sensor 18 may include a sensor array, for example, a CMOS (complementary metal-oxide semiconductor) or a CCD (charge-coupled device) array sensor. In some examples, light sensor 18 may include an array including two or more individual sensors. In some examples, at least one sensing element of light sensor 18 may receive light that is not received from wavelength selective filter 12, and may be directly received from the ambient environment, or from spatially variant microreplicated layer 14. In some examples, at least one sensing element of the plurality of sensing elements of light sensor 18 may be configured to sense light reflected from at least one optical region of wavelength selective filter 12. In some examples, at least one sensing element of the plurality of sensing elements of optical sensor 18 may be configured to sense light transmitted by at least one optical region of wavelength selective filter 12. Light sensor 18 may be configured to transmit electronic signals indicative of the sensed magnitude or intensity of light by a respective sensor element, for example, to a computing device. In some examples, an electronic device may include light sensor 18, for example, a personal computing device, a laptop, a desktop, a cellphone, a camera, an exterior or interior automobile component, a medical device, a color analyzer, a daylight sensor, a molecular analyzer, or a handheld electronic device.

While optical sensor 18 is adjacent wavelength selective layer 12 in example article 10a shown in FIG. 1A, in some examples, optical sensor 18 may be placed or disposed relatively separated or away from wavelength selective layer 12. For example, other layers may be disposed between optical sensor 18 and wavelength selective layer 12. In some examples, optical sensor 18 may be optically coupled to wavelength selective layer 12 to receive light through wavelength selective layer 12. In some examples, optical sensor 18 may be optically coupled to wavelength selective layer 12 to receive light reflected from a surface of wavelength selective layer 12. For example, a retroreflective layer or a retroreflector may be disposed adjacent wavelength selective layer 12 at the surface away from spatially variant microreplicated layer 14. Light from a source may be transmitted through both spatially variant microreplicated layer 14 and wavelength selective layer 12, and reflected by the retroreflective layer to optical sensor 18. In some examples, light from the source may be transmitted through a sample specimen before being transmitted through articles 10a-10e. In some examples, the source and optical sensor 18 may be placed adjacent each other so that light from the source reflected by the retroreflector returns to the source along substantially the same optical path. In some examples, spatially variant microreplicated layer 14 may include a predetermined pattern configured to ultimately reflect a predetermined reflected image pattern to optical sensor 18. For example, optical sensor 18 may detect different spectral patterns from different spatially variant microreplicated layers 14. Thus, in some examples, spatially variant microreplicated layer 14 may present an identification or information tag, for example, a spectral bar code. In some examples, optical sensor 18 may sense spectral bar codes and the sensed spectral signature may be matched to an element of a table of elements associated with respective spectral signatures.

In some examples, example articles described above may be used to perform example techniques. For example, an example technique may include illuminating a sample with a light source to obtain a characteristic light. The example technique may include passing the characteristic light through a spatially variant microreplicated layer optically coupled to a wavelength selective filter to transmit filtered characteristic light to each region of a plurality of regions of the wavelength selective filter at a respective incidence angle of a plurality of incidence angles. Each respective incidence angle may be associated with a known narrow band of a plurality of narrow bands. The example technique may include sensing a respective intensity of the filtered characteristic light transmitted by each respective region of the wavelength selective filter at a respective sensor element of a plurality of sensor elements. The example technique may include comparing the filtered characteristic spectrum sensed by the plurality of sensor elements with a known reference spectrum associated with a species by curve fitting each sensed respective intensity against the known reference spectrum. The curve fitting may include matching each sensed respective intensity with a respective expected intensity associated with the respective narrow band associated with the respective region that transmitted the respective intensity of the filtered characteristic light. While sensing intensity and curve fitting based on intensity are described above, in some examples, the example technique may include sensing spectral features likes peaks or band edges and curved fitting based on the respective expected spectral features. The example technique may include determining the presence of the species in the sample based on the comparison.

An example technique may include illuminating a sample with a broad-band light source to obtain a characteristic light. The example technique may include passing the characteristic light through an optical filter to transmit filtered characteristic light to a broad-band sensor at each respective predetermined angle of a plurality of predetermined angles. The example technique may include determining a cumulative spectral power distribution in angle space of the filtered characteristic light by sensing a respective intensity of the filtered characteristic light transmitted at each respective predetermined angle. The example technique may include converting the cumulative spectral power distribution in angle space to a cumulative spectral power distribution in wavelength space based on the angular dispersion of a band edge of the optical filter. The example technique may include determining a spectral power distribution of the filtered characteristic light by determining a mathematical derivative of the cumulative spectral power distribution in wavelength space. The example technique may include comparing the spectral power distribution to a known reference spectral power distribution of a species. In some examples, the example technique may include comparing a first spectral power distribution with a second spectral power distribution. For example, one or both of the first and second spectral power distribution may be determined from illuminating one or more samples. The example technique may include determining the presence of the species in the sample based on the comparison.

Example articles and techniques according to the disclosure may be used for spectral analysis in the near UV, visible, and near IR, a range from about 300-2000 nm. For example, analysis of food, plants, biological materials in-vivo (example skin) or medical samples may be performed. Color analysis and identification (of an item, a person, a safety cone/sign, or another object) may be performed based on its spectral signature.

The techniques described in this disclosure may be implemented, at least in part, in hardware, software, firmware, cloud, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in a computer system-readable medium, such as a computer system-readable storage medium, containing instructions. Instructions embedded or encoded in a computer system-readable medium, including a computer system-readable storage medium, may cause one or more programmable processors, or other processors, to implement one or more of the techniques described herein, such as when instructions included or encoded in the computer system-readable medium are executed by the one or more processors. Computer system readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer system readable media. In some examples, an article of manufacture may comprise one or more computer system-readable storage media.

Example articles and techniques according to the disclosure provide will be illustrated by the following non-limiting examples.

EXAMPLES

Example 1

Figure 2A:
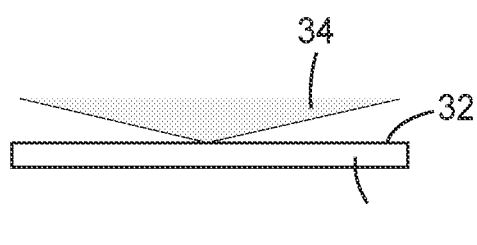
FIG. 2A is a conceptual and schematic diagram illustrating a side view of an example optical filter without a microreplicated layer.
Figure 2B:
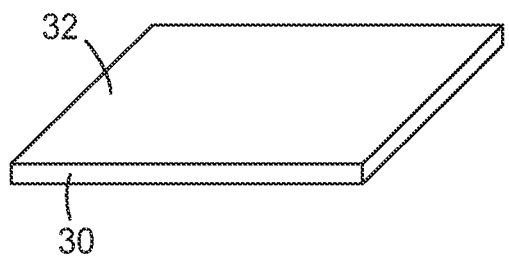
FIG. 2B is a conceptual and schematic diagram illustrating a perspective view of the example optical filter of FIG. 2A.
Figure 2C:
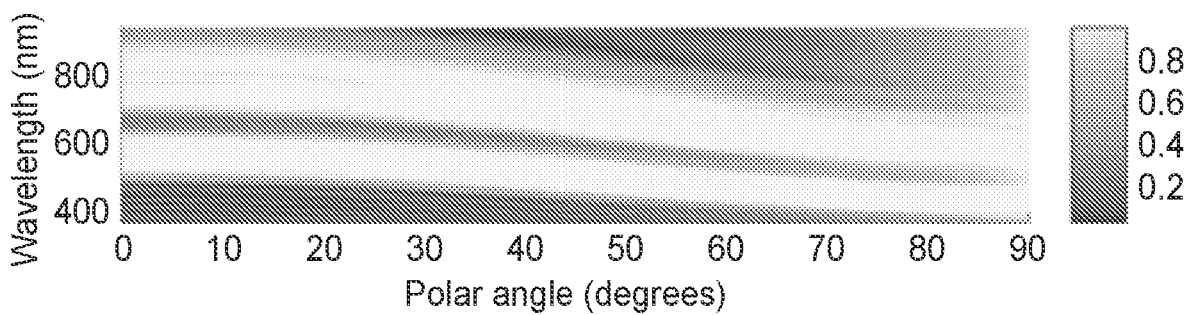
FIG. 2C is a chart presenting reflectance as a function of polar angle and wavelength for the example optical filter of FIG. 2A.
Figure 2D:
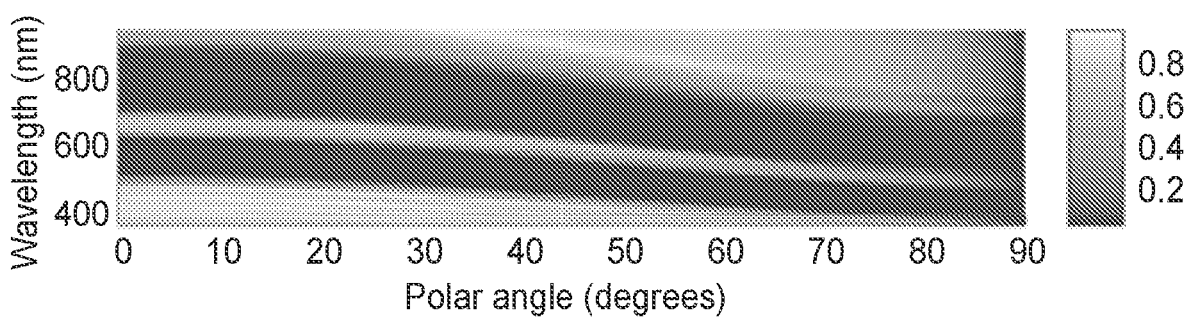
FIG. 2D is a chart presenting transmittance as a function of polar angle and wavelength for the example optical filter of FIG. 2A.

The reflectance and transmittance of a MOF band-pass filter having a narrow transmission band was established. FIG. 2A is a conceptual and schematic diagram illustrating a side view of an example optical filter 30 without a microreplicated layer. FIG. 2B is a conceptual and schematic diagram illustrating a perspective view of example optical filter 30 of FIG. 2A. As seen in FIG. 2A, signal light 34 arrives at a surface 32 of the optical filter 30. FIG. 2C is a chart presenting reflectance as a function of polar angle and wavelength for the optical filter 30 of FIG. 2A. FIG. 2D is a chart presenting transmittance as a function of polar angle and wavelength for optical filter 30 of FIG. 2A. As seen in FIGS. 2C and 2D, optical filter 30 has a narrow band-pass window around 700 nm on axis (incident angle zero relative to a normal axis on surface 32). However, as optical filter 30 is tilted, or the incident angle of signal light 34 is changed, the center of the band-pass window shifts, for example, to about 600 nm at an incident angle of 60°. Thus, by tilting optical filter 30 and/or changing the incident angle of signal light 34, different pass-band spectra were achieved with a single optical element.

Example 2

Figure 3A:
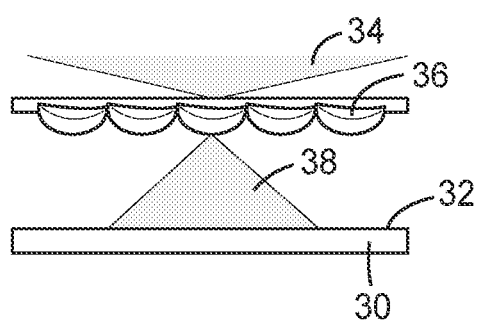
FIG. 3A is a conceptual and schematic diagram illustrating an exploded side view of an example optical filter including collimating structures.
Figure 3B:
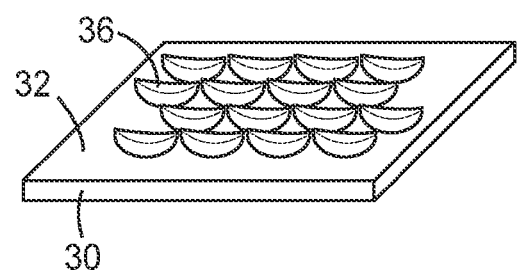
FIG. 3B is a conceptual and schematic diagram illustrating a perspective view of the example optical filter of FIG. 3A.
Figure 3C:
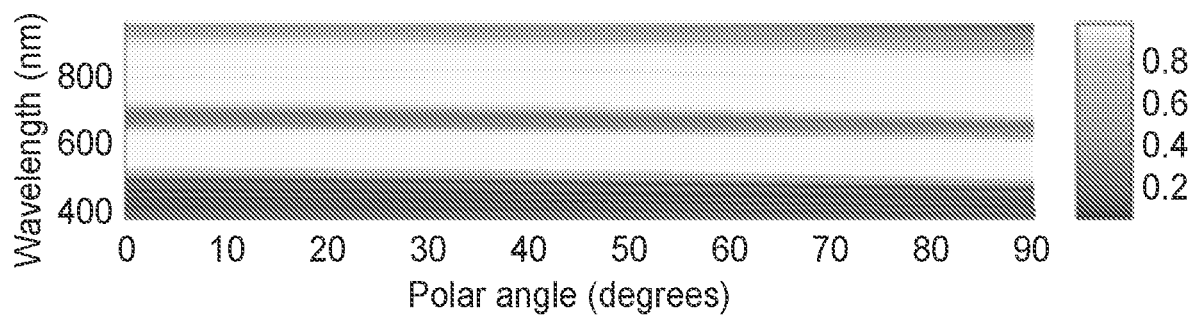
FIG. 3C is a chart presenting reflectance as a function of polar angle and wavelength for the example optical filter of FIG. 3A.
Figure 3D:
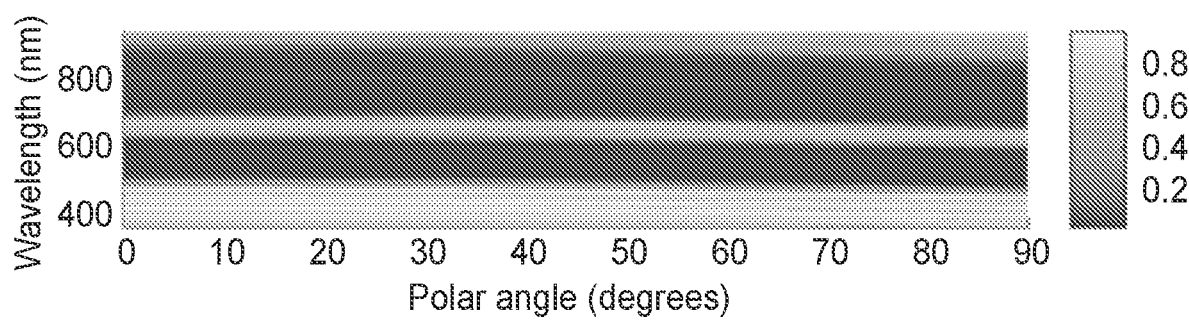
FIG. 3D is a chart presenting transmittance as a function of polar angle and wavelength for the example optical filter of FIG. 3A.

The reflectance and transmittance of a MOF band-pass filter having a narrow transmission band with a layer of collimating structures was established. FIG. 3A is a conceptual and schematic diagram illustrating an exploded side view of optical filter 30 including collimating structures 36. FIG. 3B is a conceptual and schematic diagram illustrating a perspective view of the optical filter 30 of FIG. 3A. Collimating elements, for example, a plurality of collimating structures 36 having a predetermined shape, for example, a semi-lenticular shape, were disposed between the source of signal light 34 and the surface 32 of optical filter 30. Collimating structures collimate signal light 34 into collimated light 38 incident at substantially the same range of angles on surface 32 irrespective of the incident angle of signal light 34 on collimating structures 36. Light incident at angles between 0° and 90° is collimated to light at angles between 0° and 30°. FIG. 3C is a chart presenting reflectance as a function of polar angle and wavelength for optical filter 30 having collimating structures 36. FIG. 3D is a chart presenting transmittance as a function of polar angle and wavelength for optical filter 30 having collimating structures 36. Collimating structures 36 can be shaped, for example, as high-index (n=2.0) glass lenses, to be very effective at reducing the range of angles incident onto surface 32 of optical filter 30 to the point where the response of optical filter 30 becomes largely angle-insensitive, as seen in FIGS. 3C and 3D. For example, unlike the 100 nm band shift observed in Example 1, the band shift is significantly lower in the presence of collimating structures 36.

Example 3

Figure 4A:
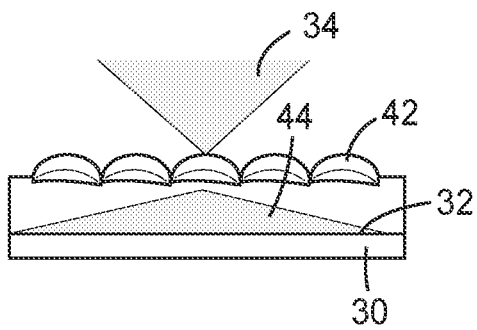
FIG. 4A is a conceptual and schematic diagram illustrating an exploded side view of an example optical filter including decollimating structures.
Figure 4B:
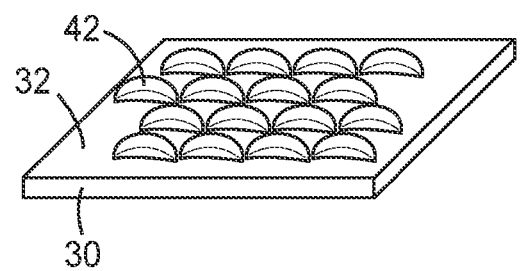
FIG. 4B is a conceptual and schematic diagram illustrating a perspective view of the example optical filter of FIG. 4A.
Figure 4C:
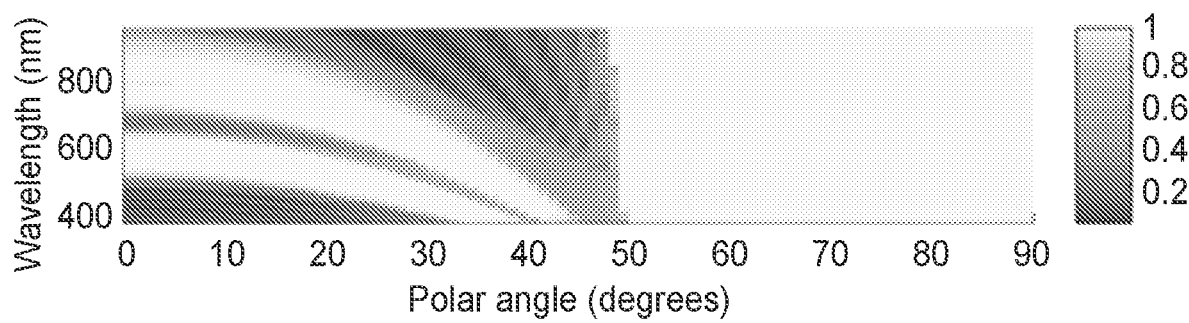
FIG. 4C is a chart presenting reflectance as a function of polar angle and wavelength for the example optical filter of FIG. 4A.
Figure 4D:
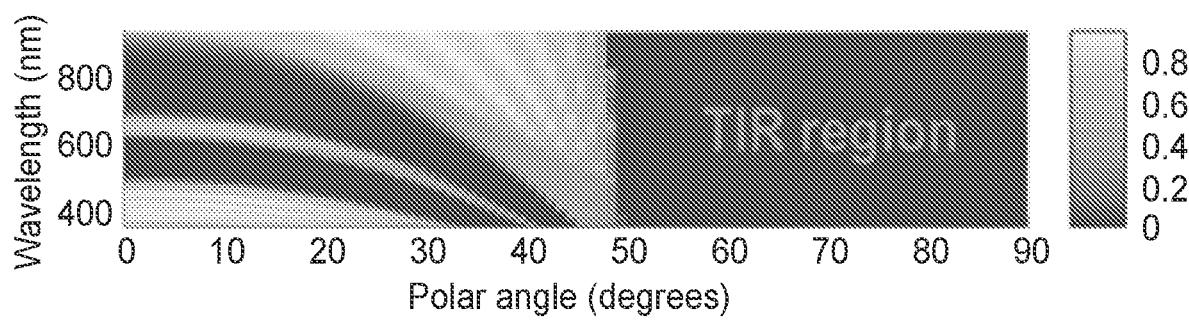
FIG. 4D is a chart presenting transmittance as a function of polar angle and wavelength for the example optical filter of FIG. 4A.

Instead of collimating light as in Example 2, alternatively, optically coupling a high-index surface structure, for example, decollimating structures, to optical filter 30 was used to enhance the angular dispersion of optical filter 30. FIG. 4A is a conceptual and schematic diagram illustrating an exploded side view of optical filter 30 including decollimating structures 42. FIG. 4B is a conceptual and schematic diagram illustrating a perspective view of the example optical filter of FIG. 4A. Decollimating elements, for example, a plurality of collimating structures 42 having a predetermined shape, for example, a semi-lenticular shape, were disposed between the source of signal light 34 and the surface 32 of optical filter 30. Decollimating structures 42 decollimate signal light 34 into decollimated light 44 incident at substantially diverged angles on surface 32 relative to the incident angle of signal light 34 on decollimating structures 42. For example, decollimating structures 42 inject high-angle light past the refraction limit. FIG. 4C is a chart presenting reflectance as a function of polar angle and wavelength for optical filter 30 with decollimating structures 42. FIG. 4D is a chart presenting transmittance as a function of polar angle and wavelength for optical filter 30 with decollimating structures 42. As seen in FIGS. 4C and 4D, the narrow pass band shifts to a greater magnitude compared to the shifts in Example 1 and Example 2, for example, from 700 nm on axis (incidence angle 0) to 400 nm at a 40-deg incident angle in air. Thus, the band-shift was increased in response to a change in the incidence angle.

Example 4

A single narrow band-pass optical filter was used for spectral analysis to distinguish between hemoglobin (Hb) and oxyhemoglobin ($HbO_2$) by characterizing the spectral shape of the extinction induced by a test sample, by combining spectra from individual narrow spectral bands, each individual narrow spectral band corresponding to a different incident angle, into one spectrum. A light source of known spectrum illuminated the test sample. The reflected or transmitted spectrum was characterized using a sensor including an array of pixels, each pixel including a sensing element, a single narrow band reflector and a high-index (n=1.65) prism structure having a prism face angle (tilt of a prism facet relative to the substrate) ranging between 0° to 80°. Unfiltered pixels are also used to measure the reference spectrum. FIGS. 5A-10D illustrate the optical filter response and the measured signal for each pixel, assuming a predetermined range of input angles of 20° to 40°.

Figure 5A:
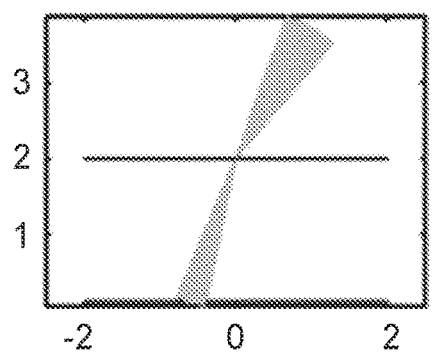
FIG. 5A is a conceptual and schematic diagram of light dispersion through an example optical filter including microreplicated features including 0° prisms.
Figure 5B:
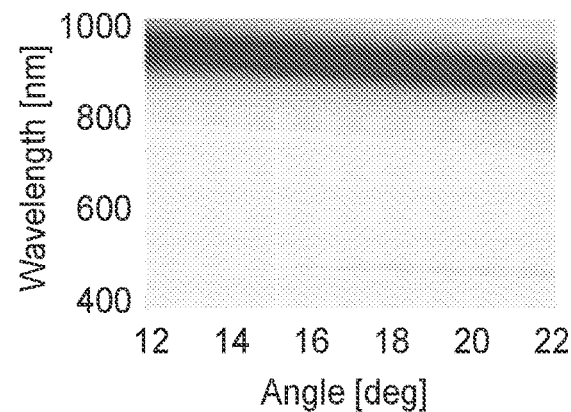
FIG. 5B is a chart presenting reflectance as a function of polar angle and wavelength for the example optical filter of FIG. 5A.
Figure 5C:
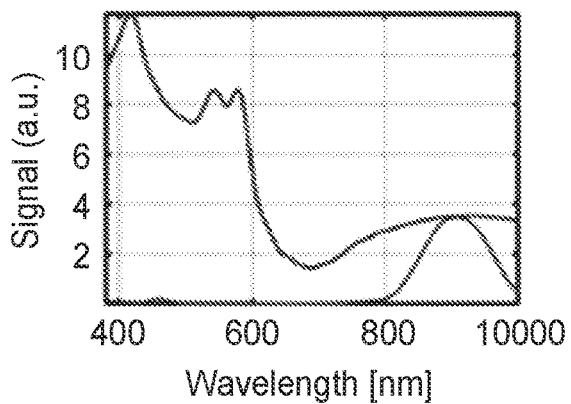
FIG. 5C is a chart comparing the spectrum of the optical filter of 5A to the reference spectrum of the sample.
Figure 5D:
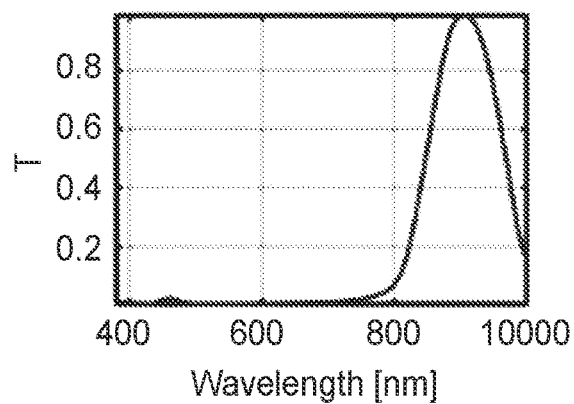
FIG. 5D is a chart presenting the spectrum of the signal filtered through the example optical filter of FIG. 5A.
Figure 6A:
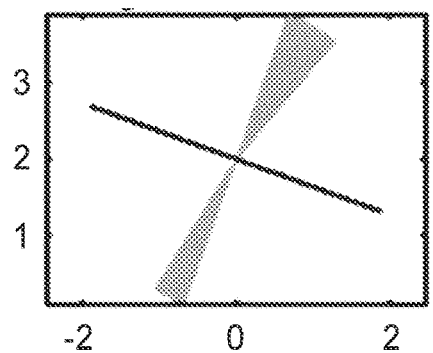
FIG. 6A is a conceptual and schematic diagram of light dispersion through an example optical filter including microreplicated features including 20° prisms.
Figure 6B:
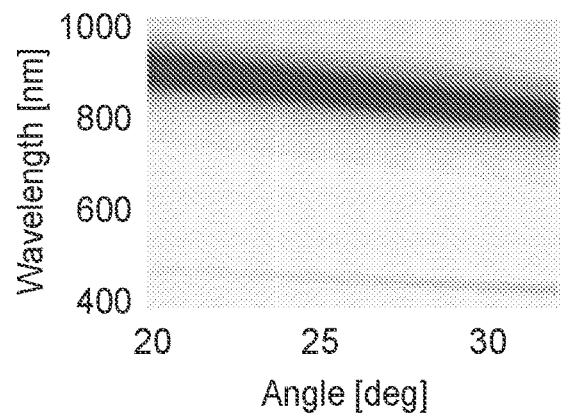
FIG. 6B is a chart presenting reflectance as a function of polar angle and wavelength for the example optical filter of FIG. 6A.
Figure 6C:
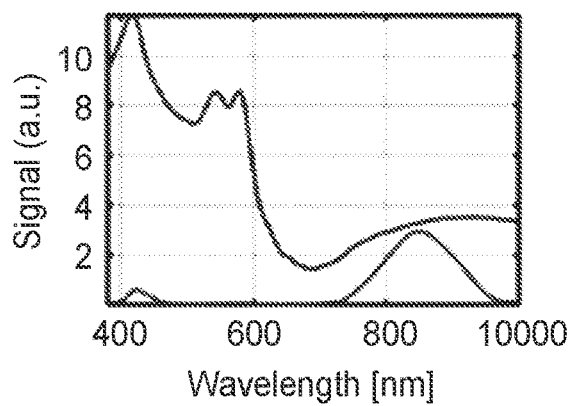
FIG. 6C is a chart comparing the spectrum of the optical filter of 6A to the reference spectrum of the sample.
Figure 6D:
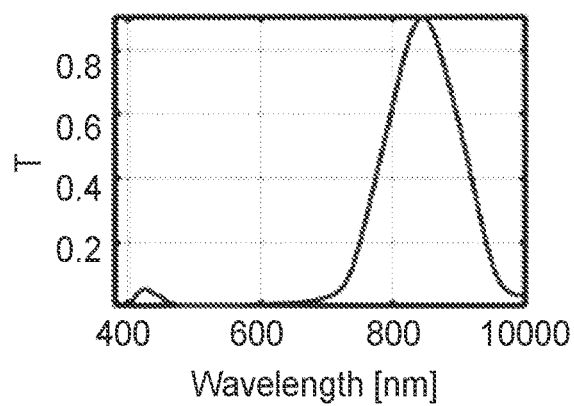
FIG. 6D is a chart presenting the spectrum of the signal filtered through the example optical filter of FIG. 6A.
Figure 7A:
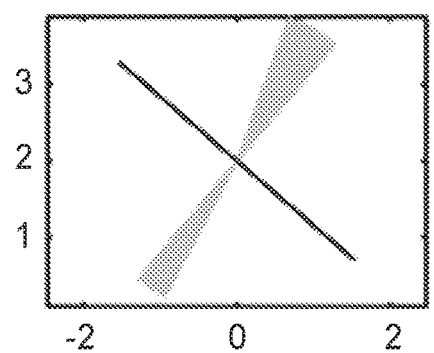
FIG. 7A is a conceptual and schematic diagram of light dispersion through an example optical filter including microreplicated features including 40° prisms.
Figure 7B:
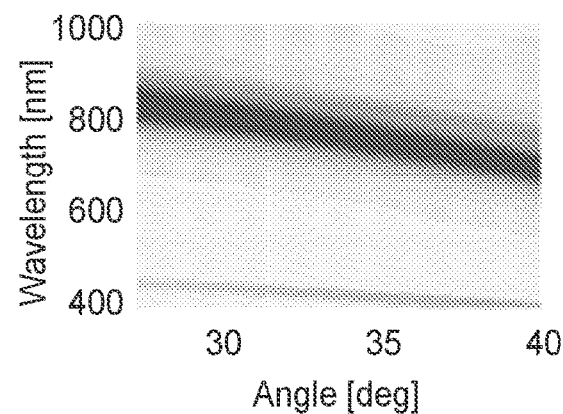
FIG. 7B is a chart presenting reflectance as a function of polar angle and wavelength for the example optical filter of FIG. 7A.
Figure 7C:
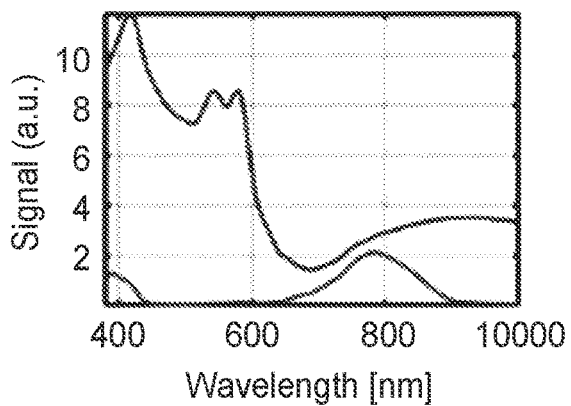
FIG. 7C is a chart comparing the spectrum of the optical filter of 7A to the reference spectrum of the sample.
Figure 7D:
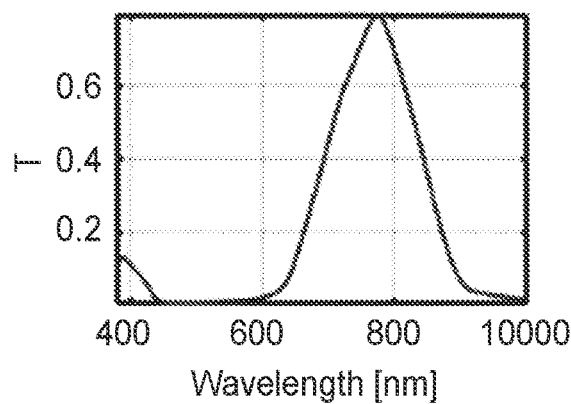
FIG. 7D is a chart presenting the spectrum of the signal filtered through the example optical filter of FIG. 7A.
Figure 8A:
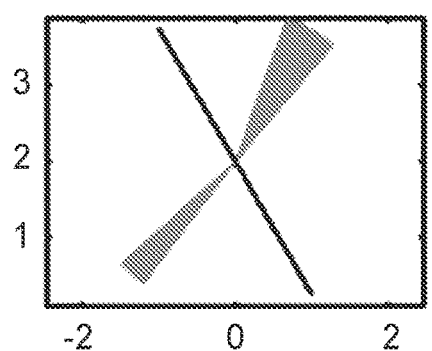
FIG. 8A is a conceptual and schematic diagram of light dispersion through an example optical filter including microreplicated features including 60° prisms.
Figure 8B:
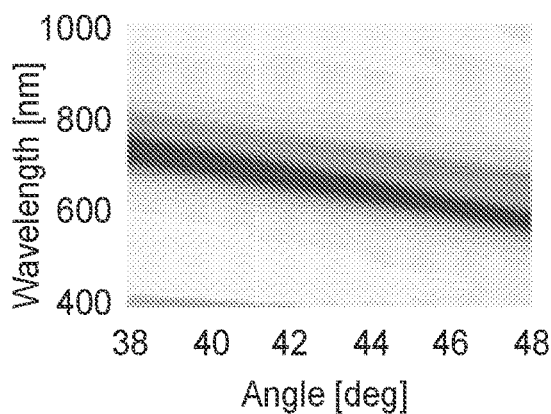
FIG. 8B is a chart presenting reflectance as a function of polar angle and wavelength for the example optical filter of FIG. 8A.
Figure 8C:
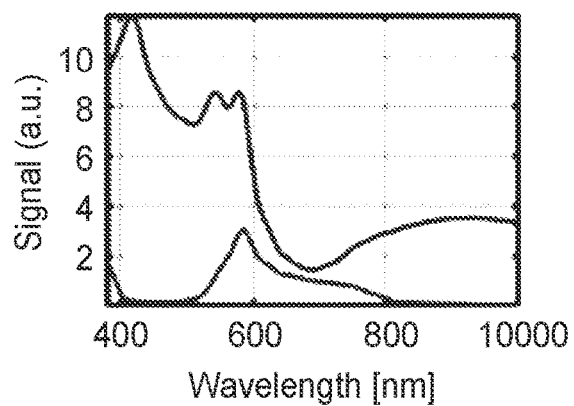
FIG. 8C is a chart comparing the spectrum of the optical filter of 8A to the reference spectrum of the sample.
Figure 8D:
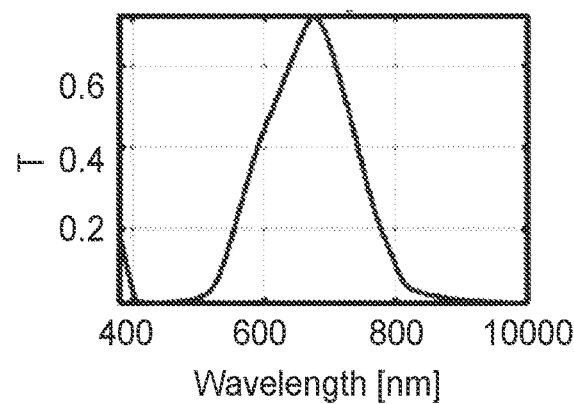
FIG. 8D is a chart presenting the spectrum of the signal filtered through the example optical filter of FIG. 8A.
Figure 9A:
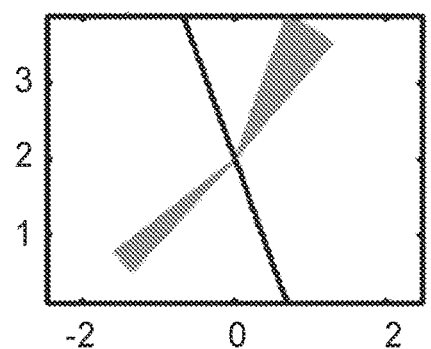
FIG. 9A is a conceptual and schematic diagram of light dispersion through an example optical filter including microreplicated features including 70° prisms.
Figure 9B:
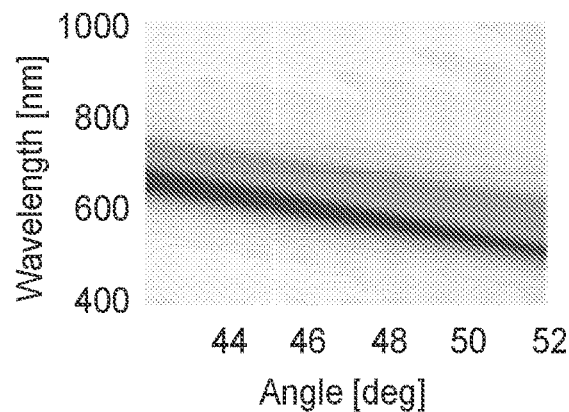
FIG. 9B is a chart presenting reflectance as a function of polar angle and wavelength for the example optical filter of FIG. 9A.
Figure 9C:
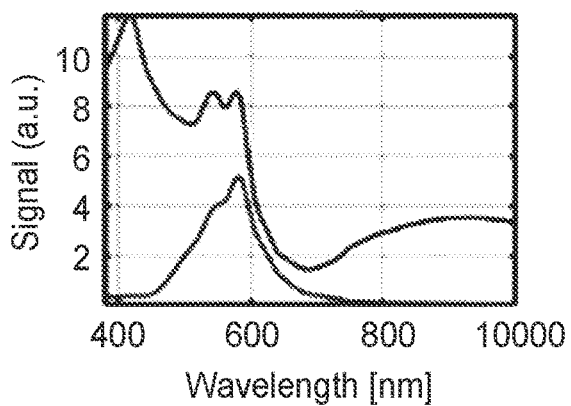
FIG. 9C is a chart comparing the spectrum of the optical filter of 9A to the reference spectrum of the sample.
Figure 9D:
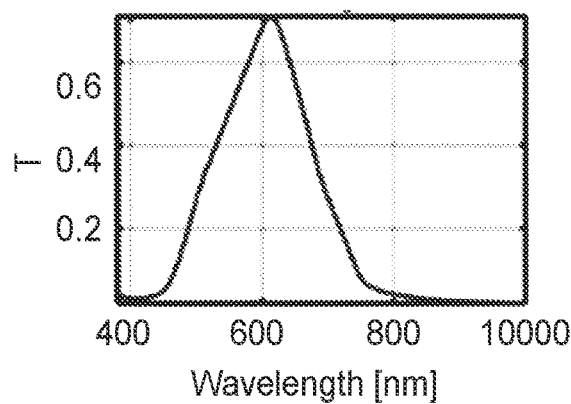
FIG. 9D is a chart presenting the spectrum of the signal filtered through the example optical filter of FIG. 9A.
Figure 10A:
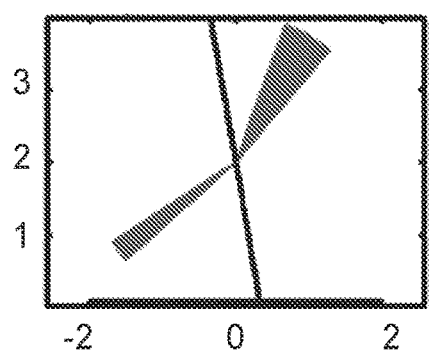
FIG. 10A is a conceptual and schematic diagram of light dispersion through an example optical filter including microreplicated features including 80° prisms.
Figure 10B:
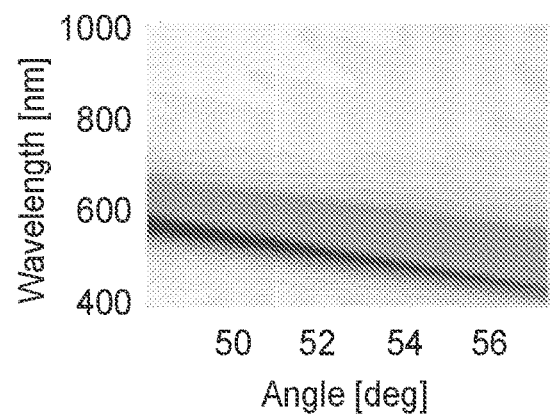
FIG. 10B is a chart presenting reflectance as a function of polar angle and wavelength for the example optical filter of FIG. 10A.
Figure 10C:
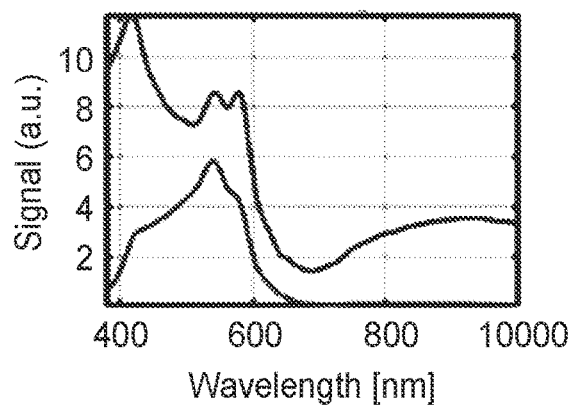
FIG. 10C is a chart comparing the spectrum of the optical filter of 10A to the reference spectrum of the sample.
Figure 10D:
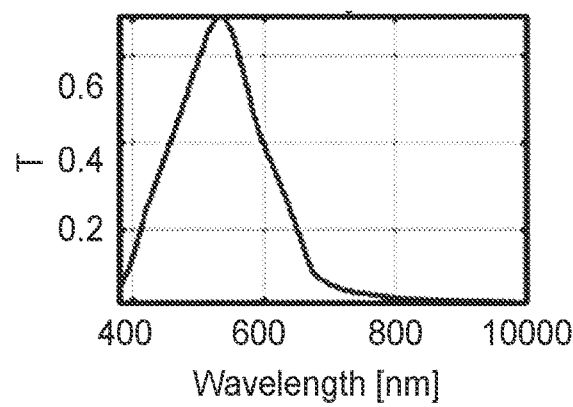
FIG. 10D is a chart presenting the spectrum of the signal filtered through the example optical filter of FIG. 10A.

FIG. 5A is a conceptual and schematic diagram of light dispersion through the optical filter including microreplicated features including 0° prisms. FIG. 5B is a chart presenting reflectance as a function of polar angle and wavelength for the example optical filter of FIG. 5A. FIG. 5C is a chart comparing the spectrum of the optical filter of 5A to the reference spectrum of the sample. FIG. 5D is a chart presenting the spectrum of the signal filtered through the example optical filter of FIG. 5A. FIG. 6A is a conceptual and schematic diagram of light dispersion through an example optical filter including microreplicated features including 20° prisms. FIG. 6B is a chart presenting reflectance as a function of polar angle and wavelength for the example optical filter of FIG. 6A. FIG. 6C is a chart comparing the spectrum of the optical filter of 7A to the reference spectrum of the sample. FIG. 6D is a chart presenting the spectrum of the signal filtered through the example optical filter of FIG. 6A. FIG. 7A is a conceptual and schematic diagram of light dispersion through an example optical filter including microreplicated features including 40° prisms. FIG. 7B is a chart presenting reflectance as a function of polar angle and wavelength for the example optical filter of FIG. 7A. FIG. 7C is a chart comparing the spectrum of the optical filter of 7A to the reference spectrum of the sample. FIG. 7D is a chart presenting the spectrum of the signal filtered through the example optical filter of FIG. 7A. FIG. 8A is a conceptual and schematic diagram of light dispersion through an example optical filter including microreplicated features including 60° prisms. FIG. 8B is a chart presenting reflectance as a function of polar angle and wavelength for the example optical filter of FIG. 8A. FIG. 8C is a chart comparing the spectrum of the optical filter of 8A to the reference spectrum of the sample. FIG. 8D is a chart presenting the spectrum of the signal filtered through the example optical filter of FIG. 8A. FIG. 9A is a conceptual and schematic diagram of light dispersion through an example optical filter including microreplicated features including 70° prisms. FIG. 9B is a chart presenting reflectance as a function of polar angle and wavelength for the example optical filter of FIG. 9A. FIG. 9C is a chart comparing the spectrum of the optical filter of 9A to the reference spectrum of the sample. FIG. 9D is a chart presenting the spectrum of the signal filtered through the example optical filter of FIG. 9A. FIG. 10A is a conceptual and schematic diagram of light dispersion through an example optical filter including microreplicated features including 80° prisms. FIG. 10B is a chart presenting reflectance as a function of polar angle and wavelength for the example optical filter of FIG. 10A. FIG. 10C is a chart comparing the spectrum of the optical filter of 10A to the reference spectrum of the sample. FIG. 10D is a chart presenting the spectrum of the signal filtered through the example optical filter of FIG. 10A.

As seen in FIGS. 5A-10D, as the incident angle on the surface of the optical filter was changed to different extents by the prisms having different prism angles, the pass band exhibited a shift, and the filter response exhibited a shift. For example, the peak in the filter response spectrum shifted from about 900 nm for the 0° prism, to about 550 nm for the 80° prism, and intermediate shifts for prisms having prism angles between 0 and 80°.

Figure 11A:
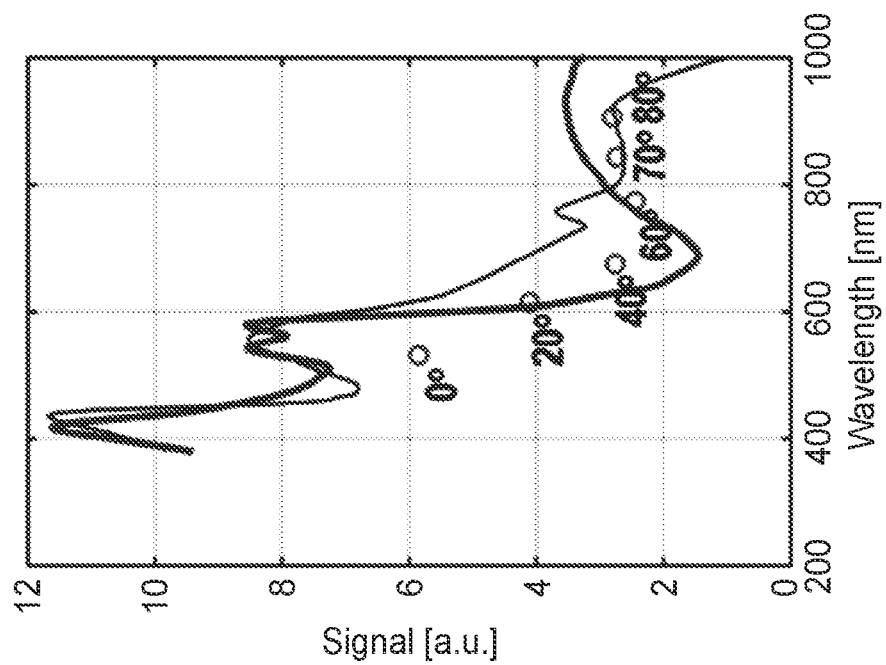
FIG. 11A is a chart presenting a spectrum obtained by combining signals from example optical filters of FIGS. 5A-10A, for light passing through a sample including hemoglobin.
Figure 11B:
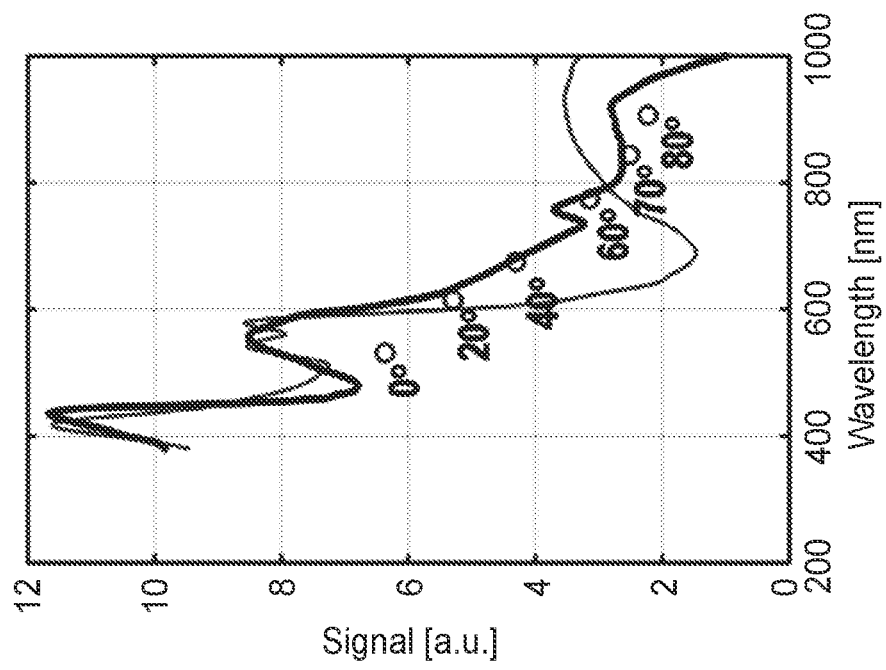
FIG. 11B is a chart presenting a spectrum obtained by combining signals from example optical filters of FIGS. 5A-10A, for light passing through a sample including oxyhemoglobin.

These spectra were combined to obtain a spectrum representing the optical response of the sample. FIG. 11A is a chart presenting a spectrum obtained by combining signals from example optical filters of FIGS. 5A-10A, for light passing through a sample including hemoglobin (Hb). FIG. 11B is a chart presenting a spectrum obtained by combining signals from example optical filters of FIGS. 5A-10A, for light passing through a sample including oxyhemoglobin (HbO$_2$). FIGS. 11A and 11B illustrate the measured spectra for Hb and HbO$_2$, each consisting of 6 data points corresponding to the 6 prism angles shown above, and compares them to their known extinction spectra. As seen in FIG. 11A, the data points measured at the respective prism angles substantially aligned with the known curve for Hb, indicating that Hb was accurately identified. In contrast, as seen in FIG. 11B, the data points measured at the respective prism angles substantially aligned with the known curve for HbO$_2$, indicating that HbO$_2$ was accurately identified. Thus, by combining the information obtained through various pixels corresponding to different incident angles, the spectral shape of the measured signal was reconstructed, enabling comparison to the known data base for identification. Thus, Hb was distinguished from HbO2.

Example 5

Figure 12A:
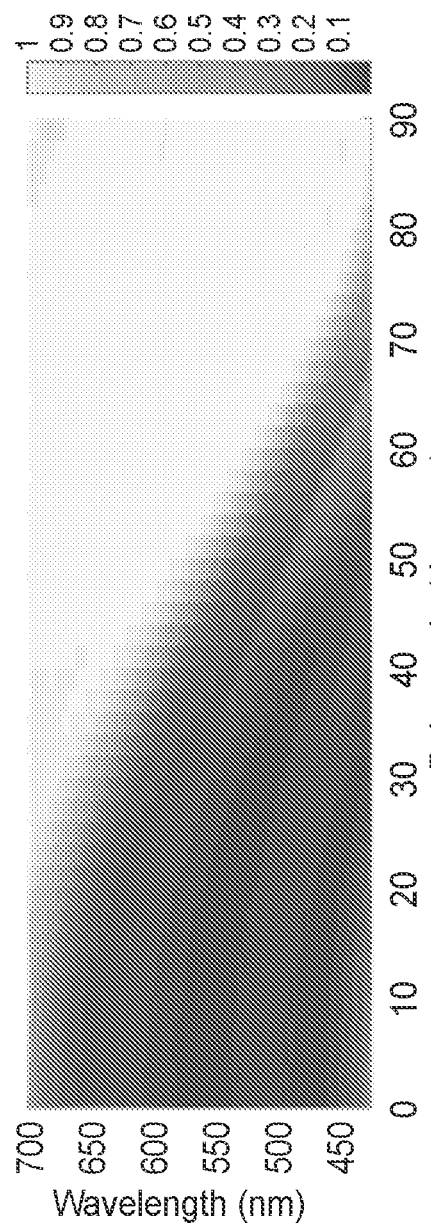
FIG. 12A is a chart presenting reflectance as a function of polar angle and wavelength for an example GBO (giant birefringence optics) filter.
Figure 12B:
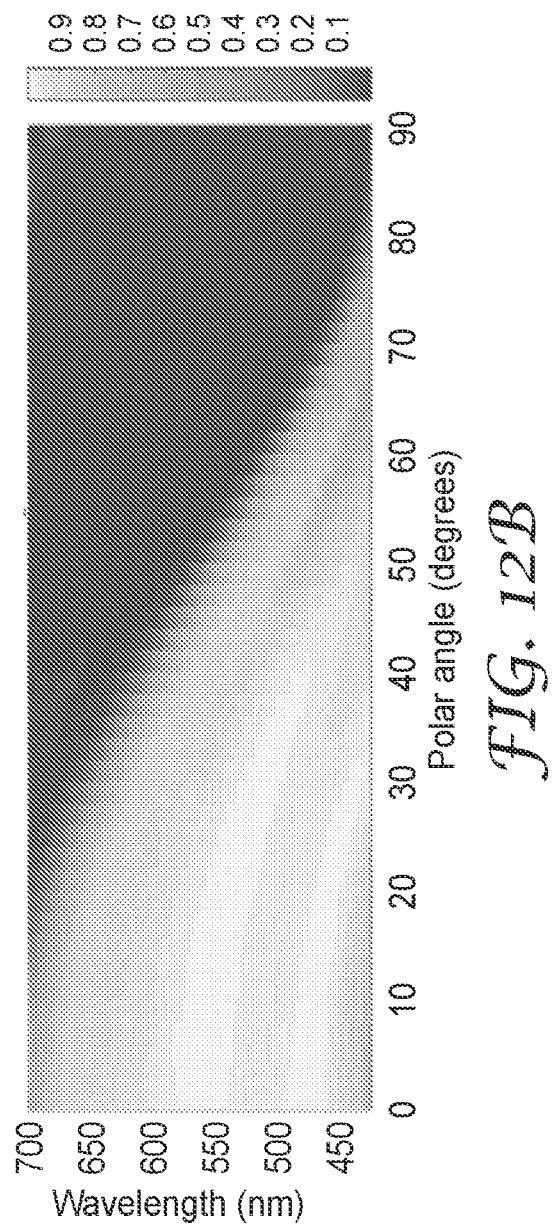
FIG. 12B is a chart presenting transmittance as a function of polar angle and wavelength for the example GBO filter.

A single narrow band-pass optical filter was used for spectral analysis to identify the composition of a sample including chlorophyll a, chlorophyll b, and β-carotene, by continuously recording a signal as a function of angle to obtain a cumulative power distribution function as a function of wavelength. Unlike the example of Example 5 where spectral information was directly measured using a moving narrow-band filter, the measured signal was now processed to extract desired spectral characteristics. A GBO (giant birefringence optics) interference filter was used to transmit all visible wavelengths on axis and block all visible wavelengths beyond 80-deg incident angle, maintaining high reflectivity at all angles and for all polarizations. FIG. 12A is a chart presenting reflectance as a function of polar angle and wavelength for an example GBO filter. FIG. 12B is a chart presenting transmittance as a function of polar angle and wavelength for the example GBO filter. The transmittance for wavelengths less than about 420 nm (not shown) was low at all angles because of intrinsic absorption of the constitutive materials of the filter. The filter was used to obtain cumulative spectral power distribution as a function of angle of incidence for light passing through the sample, which was mathematically transformed to enable comparison with known absorption spectra for chlorophyll a, β-carotene, and chlorophyll b.

Figure 13A:
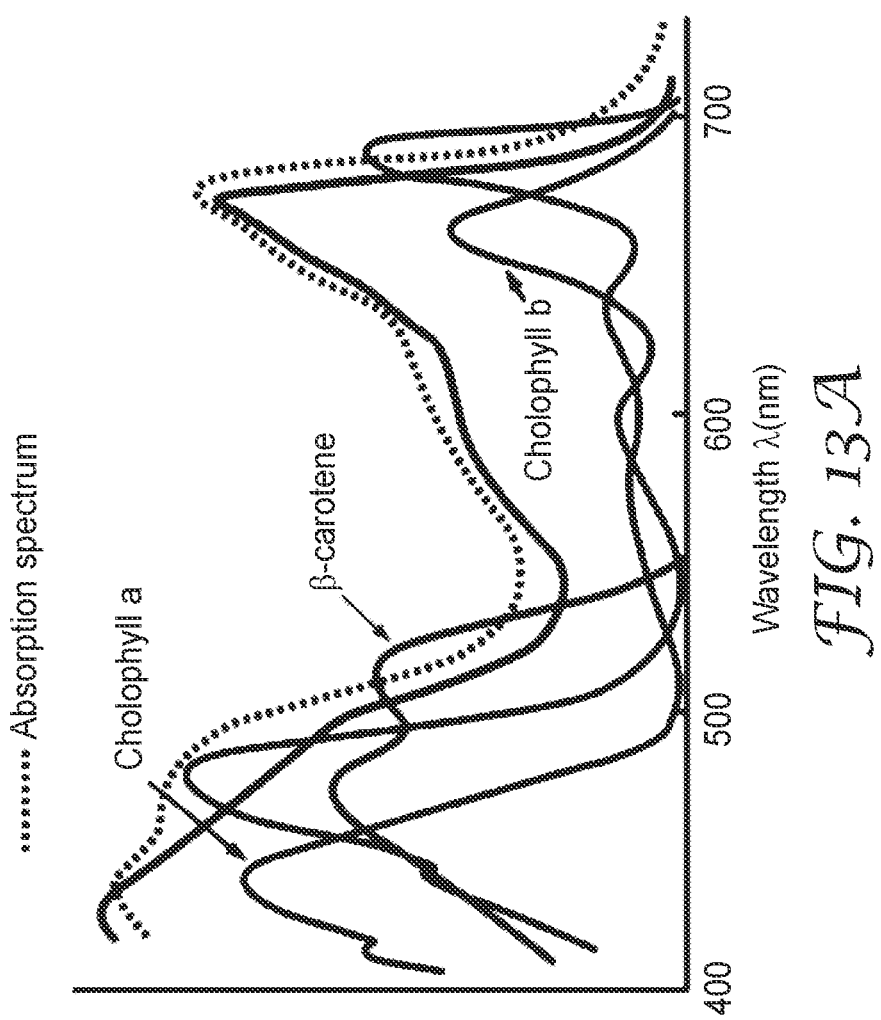
FIG. 13A is a chart presenting respective absorption spectra for chlorophyll a, β-carotene, and chlorophyll b.
Figure 13C:
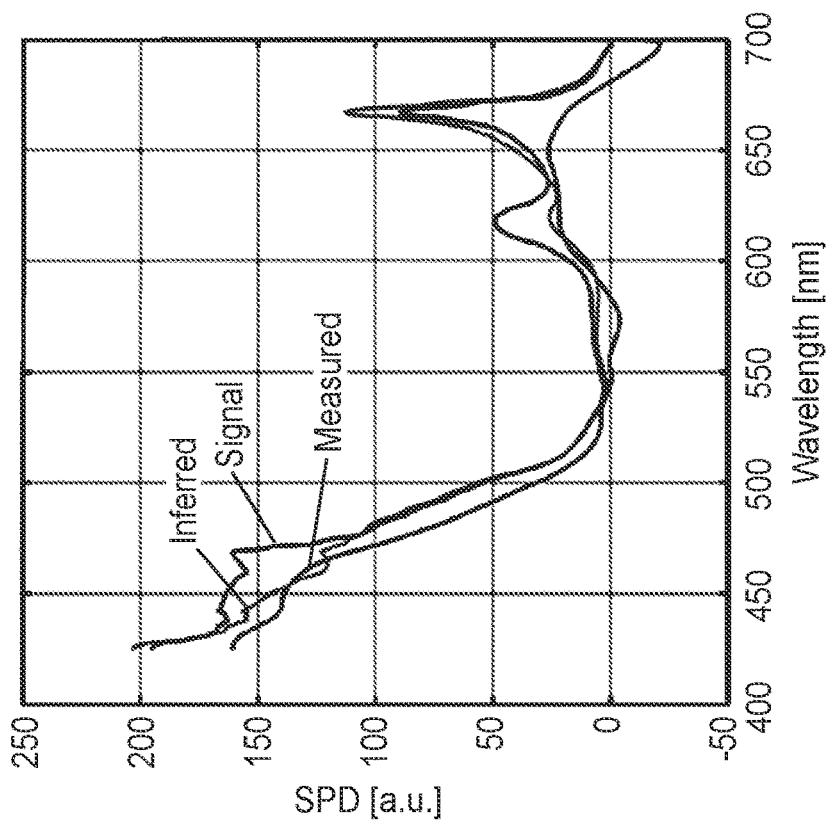
FIG. 13C is a chart presenting spectral power distribution as a function of wavelength obtained by mathematically transforming the chart of FIG. 13B.
Figure 13B:
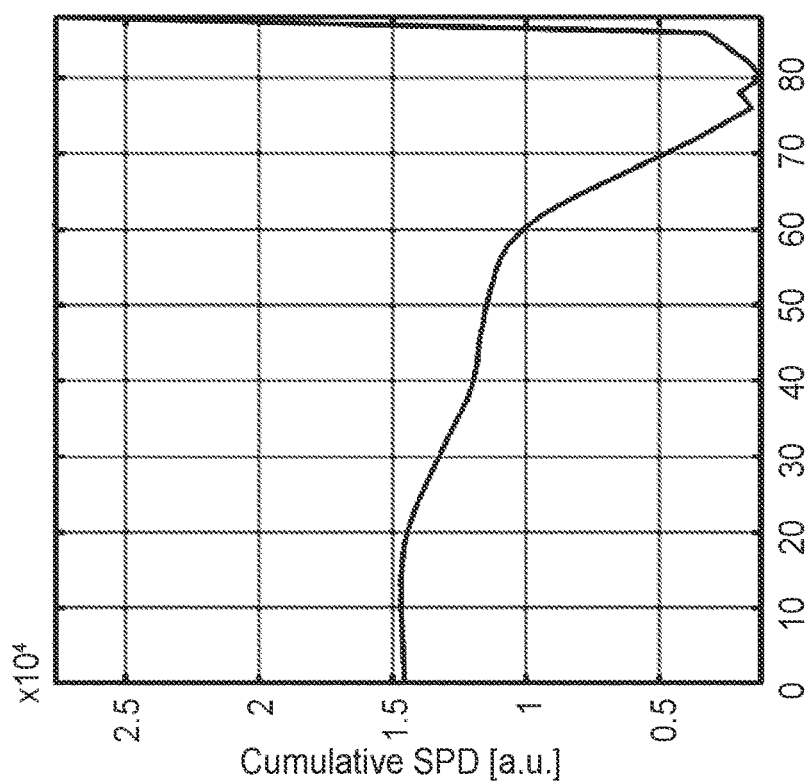
FIG. 13B is a chart presenting cumulative spectral power distribution as a function of angle of incidence for light passing through a sample composition including chlorophyll a, β-carotene, and chlorophyll b, filtered by the example GBO filter of FIG. 12A.

FIG. 13A is a chart presenting known respective absorption spectra for chlorophyll a, β-carotene, and chlorophyll b. The actual composition of the test sample was 50-30-20 (β-carotene, chlorophyll a, and chlorophyll b). A broad-band source, a broad-band sensor, and the edge filter described above, the signal from the sample was continuously recorded as a function of angle, representing the cumulative power distribution function as a function of angle. FIG. 13B is a chart presenting cumulative spectral power distribution as a function of angle of incidence for light passing through a sample composition including chlorophyll a, β-carotene, and chlorophyll b, filtered by the GBO filter having the optical characteristics of FIG. 12A. The measured signal is shown in FIG. 13B and as expected (from the transmission characteristics of the filter) monotonically decreased from 0° to 80°. The angular dispersion of the band-edge of the filter, which can easily be measured or calculated, was used to convert the data from angular to wavelength space so the measured signal represents the cumulative power distribution function as a function of wavelength. By taking the derivative of this signal, the spectral power distribution (SPD) of the signal was calculated. The x-axis was converted from angle to wavelength using the angular dispersion of the edge filter, a derivative was taken to derive the measured spectrum shown in FIG. 13C. FIG. 13C is a chart presenting spectral power distribution as a function of wavelength obtained by mathematically transforming the chart of FIG. 13B. The 'signal' curve in FIG. 13C is the reference spectrum of the mixture. The 'measured' curve is the curve obtained by taking the derivative of the SPD, and the 'inferred' curve is obtained by best mit of the mixture model (mixture of the 3 constitutive spectral characteristics) to the 'measured' curve.

Finally, a least-square fitting algorithm was used to determine the composition of the three constitutive spectra that best match the measured spectrum shown in FIG. 13C. The composition was inferred to be equal to 55:38:7.

Example 6

Figure 14:
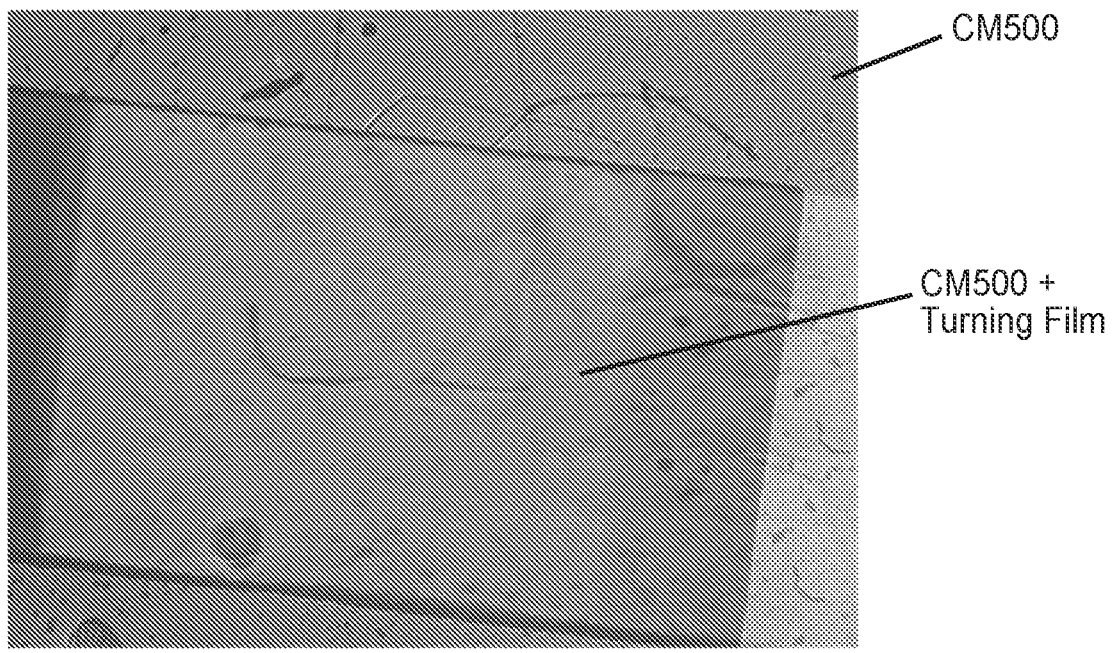
FIG. 14 is a photograph of an example article including an example optical filter including microreplicated features and a substrate.

MOF Wavelength shift using 3M Microreplicated Film (TRAF II). FIG. 14 is a photograph of an example article including an example optical filter including microreplicated features and a substrate. The photograph was obtained using an AmScope MD500 imaging sensor with CM500 film. The entire cover glass of the sensor is covered with CM500 film which is held to the glass by a removable double-sticky tape ("Scotch Restickable Tabs for Mounting"). The outer portions in the images are flat, with no microreplicated material on it. The inner portion has the TRAF II 68 deg film with prisms facing away from the sensor.

One photo is taken under white light emitted by a Hausbell flashlight with a 3 W CREE white LED that is powered by a single alkaline AA battery. The focus on the flashlight was set to wide angle. Exposure time for each photo was 0.977 ms, Gain was zero. Auto white balance was enabled. Color adjustments were all at defaults for the AmScope software, as were the other settings.

The color-shift effect is clearly demonstrated. Under white light, the film appears to shift color from violet to green. Under the red filtered light, the film appears to shift from Magenta/Red to Blue/Green. Shadow regions can also be seen due to the fact that the films were not in contact with the imaging sensor, but rather with the cover glass.

Various examples of the invention have been described. These and other examples are within the scope of the following claims.

The invention claimed is:

1. An article comprising:
   a wavelength selective filter having a light incidence angle-dependent optical band; and
   a spatially variant microreplicated layer optically coupled to the wavelength selective filter, wherein the spatially variant microreplicated layer is configured to transmit light to a first optical region of the wavelength selective filter at a first predetermined incidence angle and to a second optical region of the wavelength selective filter at a second predetermined incidence angle, the first and second predetermined incidence angles being configured to shift the angle-dependent optical band of the wavelength selective filter to different respective first and second predetermined shifted bands; and
   a light sensor coupled to the wavelength selective filter and including a plurality of light sensing elements, wherein a first light sensing element of the plurality of light sensing elements is configured to sense light received from the first optical region and a second sensing element of the plurality of light sensing elements is configured to sense the light received from the second optical region.

2. The article of claim 1, wherein the spatially variant microreplicated layer is configured to transmit light to each optical region of a plurality of optical regions of the wavelength selective filter at a respective predetermined incidence angle of a plurality of predetermined incidence angles, wherein the plurality of optical regions comprises the first and second optical regions, and wherein the plurality of predetermined incidence angles comprises the first and second predetermined incidence angles.

3. The article of claim 2, wherein each predetermined incidence angle of the plurality of predetermined incidence angles is configured to shift the angle-dependent optical band of the wavelength selective filter to a respective predetermined shifted band of a plurality of predetermined shifted bands, and wherein the plurality of predetermined shifted bands comprises the first and second predetermined shifted bands.

4. The article of claim 3, wherein the spatially variant microreplicated layer comprises a plurality of microreplicated features, wherein each microreplicated feature of the plurality of microreplicated features transmits light to a respective optical region at the respective predetermined incidence angle.

5. The article of claim 4, wherein the plurality of microreplicated features comprises a plurality of subpluralities of microreplicated features, wherein each subplurality of microreplicated features transmits light to the respective optical region at the respective predetermined incidence angle.

6. The article of claim 4, wherein each respective microreplicated feature of the plurality of microreplicated features defines a light bending angle that determines the light incidence angle of light transmitted by the respective microreplicated feature to the respective optical region of the wavelength selective filter.

7. The article of claim 4, wherein each microreplicated feature of the plurality of microreplicated features comprises a one or more of a prism, an angle-limiting element, or a collimating element.

8. The article of claim 1, wherein at least an unshifted region of the wavelength selective filter is configured to receive light that is not transmitted through the spatially variant microreplicated layer.

9. The article of claim 1, wherein the microreplicated layer comprises a planarized region configured to transmit light to the wavelength selective filter without substantially changing the angle of incidence.

10. The article of claim 1, wherein the wavelength selective filter comprises a multilayer optical film.

11. The article of claim 10, wherein the multilayer optical film comprises an interference film.

12. The article of claim 1, wherein the spatially variant microreplicated layer is configured to transmit light to each optical region of a plurality of optical regions of the wavelength selective filter, wherein the plurality of optical regions comprises the first and second optical regions, and wherein the plurality of optical regions comprises at least one reflective region.

13. The article of claim 1, wherein the spatially variant microreplicated layer is configured to transmit light to each optical region of a plurality of optical regions of the wavelength selective filter, wherein the plurality of optical regions comprises the first and second optical regions, and wherein the plurality of optical regions comprises at least one transmissive region.

14. The article of claim 1, wherein the spatially variant microreplicated layer is configured to transmit light to each optical region of a plurality of optical regions of the wavelength selective filter, wherein the plurality of optical regions comprises the first and second optical regions, and wherein at least one sensing element of the plurality of light sensing elements is configured to sense light reflected from the plurality of optical regions.

15. The article of claim 1, wherein the spatially variant microreplicated layer is configured to transmit light to each optical region of a plurality of optical regions of the wavelength selective filter, wherein the plurality of optical regions comprises the first and second optical regions, and wherein at least one sensing element of the plurality of light sensing elements is configured to sense light transmitted by the plurality of optical regions.

16. The article of claim 1, wherein the optical band comprises one or more of a reflective band, a transmissive band, a narrow band, a broad band, a visible band, a near-infrared band, a pass band, or a stop band.

17. An article comprising:
a wavelength selective filter having a first band edge at a first light incidence angle and a second band edge at a second light incidence angle; and
a spatially variant microreplicated layer optically coupled to the wavelength selective filter, wherein the spatially variant microreplicated layer comprises a plurality of microreplicated features, wherein at least one first microreplicated feature of the plurality of microreplicated features comprises a first prism configured to transmit light to a first region of the wavelength selective filter at the first light incidence angle and at least one second microreplicated feature of the plurality of microreplicated features comprises a second prism configured to transmit light to a second region of the wavelength selective filter at the second light incidence angle, the first and second prisms having different prism apex angles or different refractive indices; and
a light sensor coupled to the wavelength selective filter and including a first light sensing element configured to sense light received from the first region of the wavelength selective filter at the first light incidence angle and a second sensing element configured to sense light received from the second region of the wavelength selective filter at the second light incidence angle.

18. The article of claim 17, wherein the plurality of microreplicated features comprises a plurality of subpluralities of microreplicated features, wherein at least a first subplurality of the subpluralities of microreplicated features comprises the at least one first microreplicated feature, and wherein each microreplicated feature of the first subplurality of microreplicated features is configured to transmit light to the first region of the wavelength selective filter at the first light incidence angle.

19. The article of claim 18, wherein the plurality of microreplicated features comprises at least a second subplurality of the subpluralities of microreplicated features, the second subplurality of the subpluralities of microreplicated features comprising the at least one second microreplicated feature, and wherein each microreplicated feature of the second subplurality of microreplicated features is configured to transmit light to the second region of the wavelength selective filter at the second light incidence angle.

20. The article of claim 17, wherein the wavelength selective filter comprises one or more of an edge filter, a notch filter, or a comb filter.

21. The article of claim 17, wherein the wavelength selective filter comprises a polarized filter or a non-polarized filter.

22. An article comprising:
- a wavelength selective filter having a light incidence angle-dependent optical band; and
- a spatially variant refractive structure layer optically coupled to the wavelength selective filter, wherein the spatially variant refractive structure layer is configured to transmit light to a first optical region of the wavelength selective filter at a first predetermined incidence angle and to a second optical region of the wavelength selective filter at a second predetermined incidence angle; and
- a light sensor coupled to the wavelength selective filter and including a plurality of light sensing elements,
- wherein a first light sensing element of the plurality of light sensing elements is configured to sense light received from the first optical region and a second sensing element of the plurality of light sensing elements is configured to sense the light received from the second optical region, and wherein at least one of the first predetermined incidence angle and the second predetermined incidence angle is a supercritical angle.

* * * * *